(12) United States Patent
Ishizu et al.

(10) Patent No.: US 9,818,374 B2
(45) Date of Patent: Nov. 14, 2017

(54) LIGHT SOURCE UNIT, PROJECTION APPARATUS, PROJECTION METHOD AND A PROGRAM MEDIUM

(71) Applicant: CASIO COMPUTER CO., LTD., Shibuya-ku, Tokyo (JP)

(72) Inventors: Takeo Ishizu, Higashimurayama (JP); Toshiharu Arai, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 485 days.

(21) Appl. No.: 14/331,852

(22) Filed: Jul. 15, 2014

(65) Prior Publication Data

US 2015/0029234 A1    Jan. 29, 2015

(30) Foreign Application Priority Data

Jul. 24, 2013  (JP) ................................. 2013-153178
Sep. 11, 2013  (JP) ................................. 2013-187899

(51) Int. Cl.
  *G03B 21/20* (2006.01)
  *H04N 9/31* (2006.01)
  (Continued)

(52) U.S. Cl.
  CPC ............. *G09G 5/18* (2013.01); *G09G 3/3413* (2013.01); *G09G 5/02* (2013.01); *H04N 5/7416* (2013.01);
  (Continued)

(58) Field of Classification Search
  None
  See application file for complete search history.

(56) References Cited

U.S. PATENT DOCUMENTS 8,348,435 B2   1/2013 Ogino et al.
8,393,741 B2   3/2013 Fukano
(Continued)

FOREIGN PATENT DOCUMENTS

JP    2011095388 A    5/2011
JP    2011095391 A    5/2011
(Continued)

OTHER PUBLICATIONS

Japanese Office Action (and English translation thereof) dated May 9, 2017, issued in counterpart Japanese pplication No. JP 2013-187899.

*Primary Examiner* — Ryan Howard
(74) *Attorney, Agent, or Firm* — Holtz, Holtz & Volek PC

(57) ABSTRACT

Disclosed is a light source unit which emits fluorescence light to a display element which displays an image by using the fluorescence light including an excitation light source which emits excitation light, a fluorescent plate including a fluorescence emission region on a surface of a circular substrate which emits the fluorescence light by the fluorescence emission region being irradiated with the excitation light from the excitation light source, a drive unit which rotates the fluorescent plate in a circumferential direction and a control unit which controls the excitation light source and the drive unit. And the control unit controls the drive unit so that a display frequency of the display element and a rotation frequency of the fluorescent plate fulfill formula (1)

$j \times$ display frequency $= k \times$ rotation frequency ($j, k$ are integers, $j > k$)   (1).

23 Claims, 14 Drawing Sheets

(51) Int. Cl.
  *G09G 5/18* (2006.01)
  *G09G 5/02* (2006.01)
  *H04N 5/74* (2006.01)
  *G09G 3/34* (2006.01)

(52) U.S. Cl.
  CPC ....... *H04N 9/3155* (2013.01); *G03B 21/2053* (2013.01); *G09G 2310/0235* (2013.01)

(56) References Cited

U.S. PATENT DOCUMENTS

| | | |
|---|---|---|
| 8,405,014 B2 | 3/2013 | Shibasaki |
| 8,616,710 B2 | 12/2013 | Fukano |
| 8,684,537 B2 | 4/2014 | Ogawa |
| 8,733,945 B2 | 5/2014 | Ogino et al. |
| 8,840,253 B2 | 9/2014 | Kitano |
| 9,022,577 B2 | 5/2015 | Murai |
| 9,244,338 B2 | 1/2016 | Toyooka et al. |
| 9,274,406 B2 | 3/2016 | Toyooka et al. |
| 9,588,411 B2 | 3/2017 | Kitano |
| 2010/0309391 A1* | 12/2010 | Plut .................. H04N 9/3147 348/756 |
| 2011/0234923 A1* | 9/2011 | Yamagishi .......... G03B 21/204 348/757 |
| 2013/0229631 A1* | 9/2013 | Toyooka .............. G03B 21/204 353/31 |
| 2016/0231643 A1 | 8/2016 | Toyooka et al. |

FOREIGN PATENT DOCUMENTS

| | | |
|---|---|---|
| JP | 2011095392 A | 5/2011 |
| JP | 2011216294 A | 10/2011 |
| JP | 2012103398 A | 5/2012 |
| JP | 2012212129 A | 11/2012 |
| JP | 2013011794 A | 1/2013 |
| JP | 2013118172 A | 6/2013 |

* cited by examiner

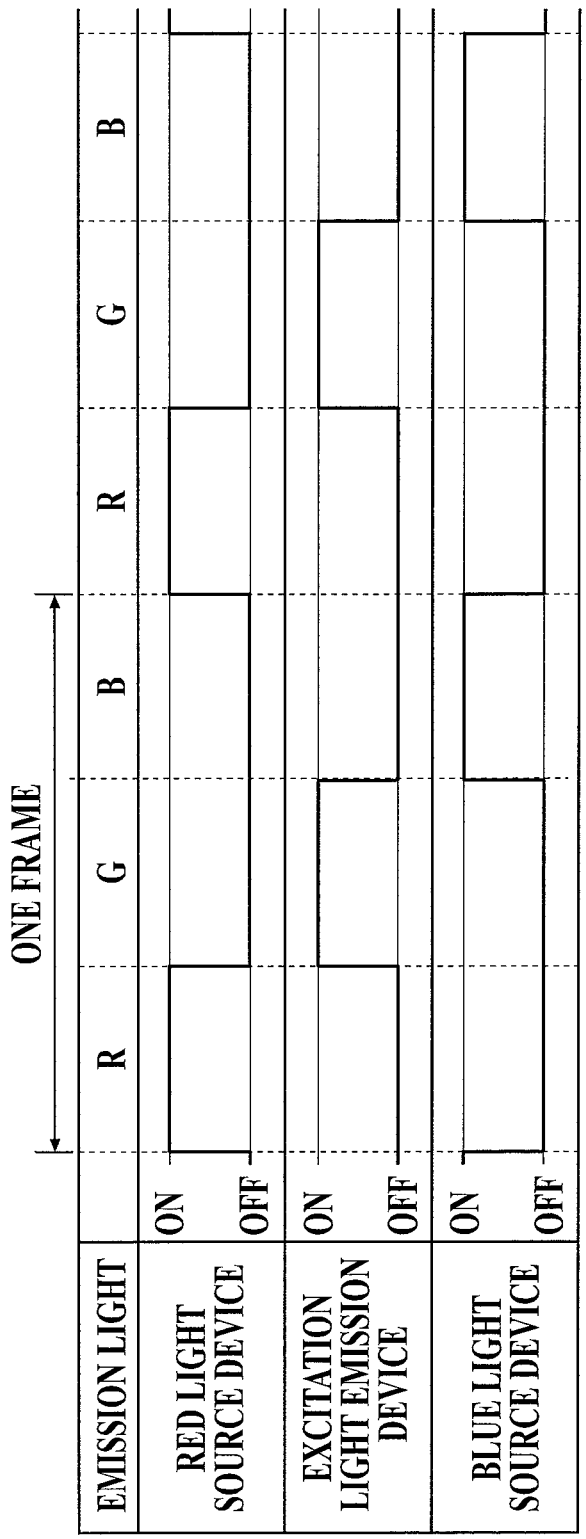

FIG.6A

| EMISSION LIGHT | | R | W | G | B | R | W | G | B |
|---|---|---|---|---|---|---|---|---|---|
| RED LIGHT SOURCE DEVICE | ON / OFF | ‾‾| ‾‾|  |  | ‾‾| ‾‾|  |  |
| EXCITATION LIGHT EMISSION DEVICE | ON / OFF |  | ‾‾| ‾‾|  |  | ‾‾| ‾‾|  |
| BLUE LIGHT SOURCE DEVICE | ON / OFF |  | ‾‾|  | ‾‾|  | ‾‾|  | ‾‾|

ONE FRAME

FIG.6B

| EMISSION LIGHT | | R | Y | G | B | R | Y | G | B |
|---|---|---|---|---|---|---|---|---|---|
| RED LIGHT SOURCE DEVICE | ON / OFF | ‾‾| ‾‾|  |  | ‾‾| ‾‾|  |  |
| EXCITATION LIGHT EMISSION DEVICE | ON / OFF |  | ‾‾| ‾‾|  |  | ‾‾| ‾‾|  |
| BLUE LIGHT SOURCE DEVICE | ON / OFF |  |  |  | ‾‾|  |  |  | ‾‾|

ONE FRAME

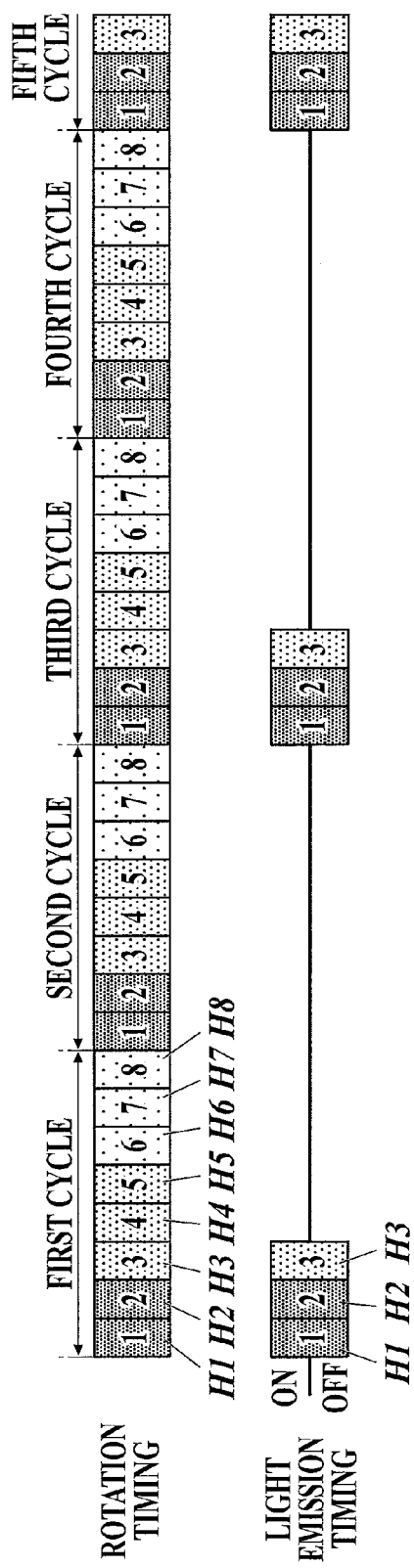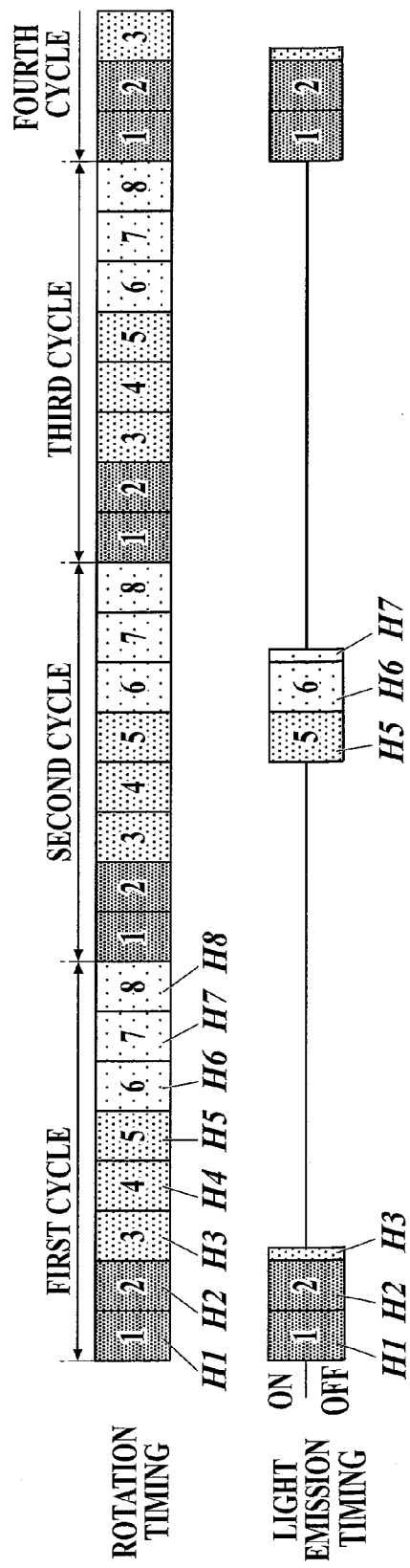

FIG.10

| DISPLAY FREQUENCY | j / k | TARGET ROTATION FREQUENCY | |
|---|---|---|---|
| | | 135Hz | UPPER LIMIT |
| 85Hz | 1.5 | 127.5Hz | |
| 75Hz | 1.5 | 112.5Hz | |
| 67Hz OR GREATER, SMALLER THAN 68Hz | | LAST TARGET ROTATION FREQUENCY | |
| 60HZ | 2 | 120Hz | |
| 50Hz | 2 | 100Hz | |
| | | 95Hz | LOWER LIMIT |

LIGHT SOURCE UNIT, PROJECTION APPARATUS, PROJECTION METHOD AND A PROGRAM MEDIUM

CROSS-REFERENCE TO RELATED APPLICATION

This application is based upon and claims the benefit of priority of the prior Japanese Patent Application No. 2013-187899 filed on Sep. 11, 2013 and Japanese Patent Application No. 2013-153178 filed on Jul. 24, 2013, the entire contents of which are incorporated herein by reference.

BACKGROUND OF THE INVENTION

1. Field of the Invention

The present invention relates to a light source unit, a projection apparatus, a projection method and a program medium.

2. Description of Related Art

As a projection apparatus, there is known a projection apparatus having a light source unit which includes an excitation light emission device which emits blue excitation light, a fluorescent plate having a fluorescent layer (fluorescence emission region) which converts the blue light into green light by the blue light being emitted toward the fluorescent layer from the excitation light emission device, a red light source device which emits red light, a blue light source device which emits blue light and a display element, such as a DMD, which projects an image on a screen by reflecting the green light, red light and blue light (for example, see JP 2011-095388).

However, there are cases where the fluorescent layer of the fluorescent plate is uneven. When blue light is emitted to such fluorescent layer of the fluorescent plate to be converted into green light, intensity of the green light temporally varies due to such unevenness. This also affects the projection image and causes flickering, for example.

SUMMARY OF THE INVENTION

It is, therefore, an object of the present invention is to control the influence of fluorescent layer unevenness on a projection image even if the fluorescent layer of the fluorescent plate is uneven and to stabilize the projection image.

In order to solve the above problem, according to one aspect of the present invention, there is provided a light source unit which emits fluorescence light to a display element which displays an image by using the fluorescence light including an excitation light source which emits excitation light, a fluorescent plate including a fluorescence emission region on a surface of a circular substrate which emits the fluorescence light by the fluorescence emission region being irradiated with the excitation light from the excitation light source, a drive unit which rotates the fluorescent plate in a circumferential direction and a control unit which controls the excitation light source and the drive unit, and the control unit controls the drive unit so that a display frequency of the display element and a rotation frequency of the fluorescent plate fulfill formula (1)

$$j \times \text{display frequency} = k \times \text{rotation frequency } (j, k \text{ are integers}, j > k) \quad (1)$$

According to another aspect of the present invention, there is provided a projection apparatus including the light source unit according to claim 1, the display element, a light guiding optical system which guides light from the light source unit to the display element, a projection side optical system which projects an image output from the display element on a screen and a projection control unit which controls the light source unit and the display element.

According to another aspect of the present invention, there is provided a projection method to emit fluorescence light to a display element which displays an image by using the fluorescence light, the method including rotating a fluorescent plate including a fluorescence emission region on a surface of a circular substrate and generating the fluorescence light by emitting excitation light to the fluorescence emission region, and at a time of the rotating and the generating, a display frequency of the display element and a rotation frequency of the fluorescent plate fulfill formula (1)

$$j \times \text{display frequency} = k \times \text{rotation frequency } (j, k \text{ are integers}, j > k) \quad (1)$$

According to another aspect of the present invention, there is provided a non-transitory recording medium which stores a program to be executed by a light source unit including an excitation light source which emits excitation light, a fluorescent plate including a fluorescence emission region on a surface of a circular substrate which emits the fluorescence light to a display element which displays an image by the fluorescence emission region being irradiated with the excitation light from the excitation light source and a drive unit which rotates the fluorescent plate in a circumferential direction, and the program makes the drive unit function so that a display frequency of the display element and a rotation frequency of the fluorescent plate fulfill formula (1)

$$j \times \text{display frequency} = k \times \text{rotation frequency } (j, k \text{ are integers}, j > k) \quad (1)$$

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a timing chart showing lighting periods of an excitation light emission device and two types of light source devices according to the first embodiment;

FIG. 6A is another example of a timing chart showing lighting periods of an excitation light emission device and two types of light source devices according to the first embodiment;

FIG. 6B is still another example of a timing chart showing lighting periods of an excitation light emission device and two types of light source devices according to the first embodiment;

FIG. 9A is a timing chart showing excitation light emission timing and rotation timing of the fluorescent wheel 101 according to the first embodiment, and shows a case where the fluorescent wheel 101 rotates at a rotation frequency which is double a display frequency;

FIG. 9B is a timing chart showing excitation light emission timing and rotation timing of the fluorescent wheel 101 according to the first embodiment, and shows a case where the fluorescent wheel 101 rotates at a rotation frequency which is 1.5 times a display frequency;

FIG. 10 is a table showing an example of a relation between display frequency and target rotation frequency decided by the speed control processing according to the first embodiment;

DESCRIPTION OF THE PREFERRED EMBODIMENTS

Figure 1:
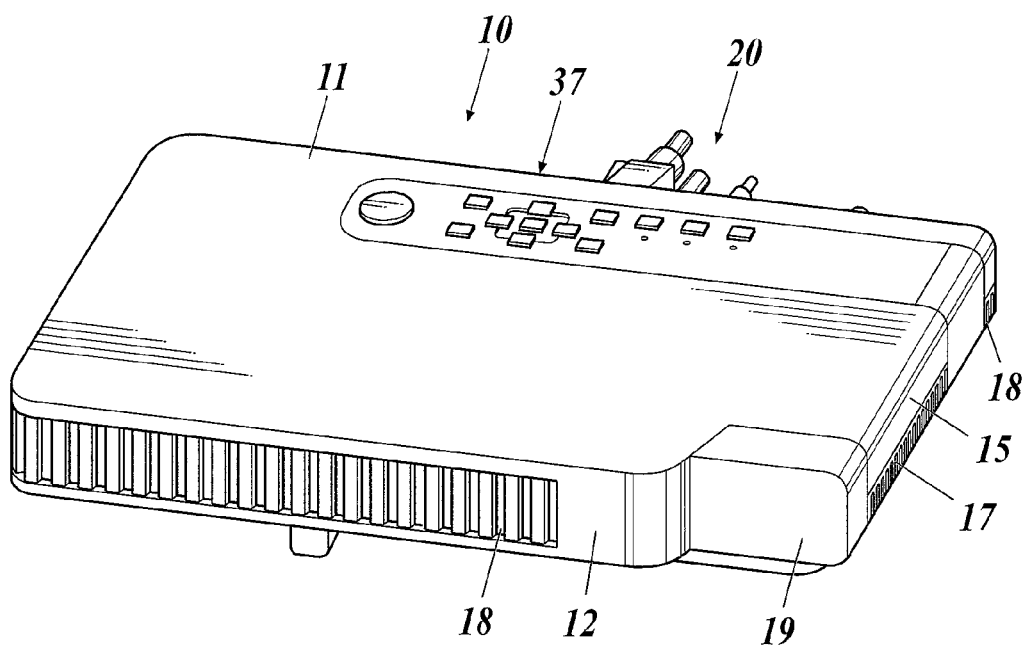
FIG. 1 is an outer perspective view of a projection apparatus provided with a light source unit according to the first embodiment.

Hereinafter, the best mode to carry out the present invention will be described with reference to the drawings. Although various limitations which are technically preferred to implement the present invention are included in the following embodiments, the scope of the invention is not limited to the following embodiments and the examples shown in the drawings.

First Embodiment

FIG. 1 is an outer perspective view of the projection apparatus 10.

In the embodiment, the left and right of the projection apparatus 10 refers to the left and right directions with respect to the projecting direction, and the front and back of the projection apparatus 10 refers to the front and back directions with respect to the direction toward a screen of the projection apparatus 10 and the traveling direction of a bundle of rays.

As shown in FIG. 1, the projection apparatus 10 is in approximate rectangular shape.

The projection apparatus 10 includes a lens cover 19 which covers the projection opening, the lens cover 19 arranged at an end of the front panel 12 which is the front side board of the projector case. Further, the front panel 12 has a plurality of intake holes 18. Further, the front panel 12 has an Ir receiving unit (not shown in the drawings) which receives control signals from a remote control.

The upper panel 11 of the case has a key/indicator unit 37. In the key/indicator unit 37, a power switch key, a projection switch key, indicators such as a power indicator and an over heat indicator, etc. are arranged. With the projection switch key, projection can be switched between on and off. With the power indicator, power on or power off is informed. With the overheat indicator, over heat of a light source unit, a display element, a control unit, etc. is informed.

On the back of the case, the back panel has various terminals 20 such an input-output connector unit including a USB terminal, a. D-SUB terminal for image signal input, an S terminal, an RCA terminal, etc. and a power adaptor plug. Further, the back panel has a plurality of inlet holes 18. Here, each of the right panel (not shown in the drawing) which is a side board of the case and the left panel 15 which is a side board shown in FIG. 1 has a plurality of outlet holes 17. At a corner part of the left panel 15 near the back panel, inlet holes 18 are also formed. A plurality of inlet holes and outlet holes are also formed in the bottom panel (not shown in the drawing) at parts near the front, back, left and right panels.

Figure 2:
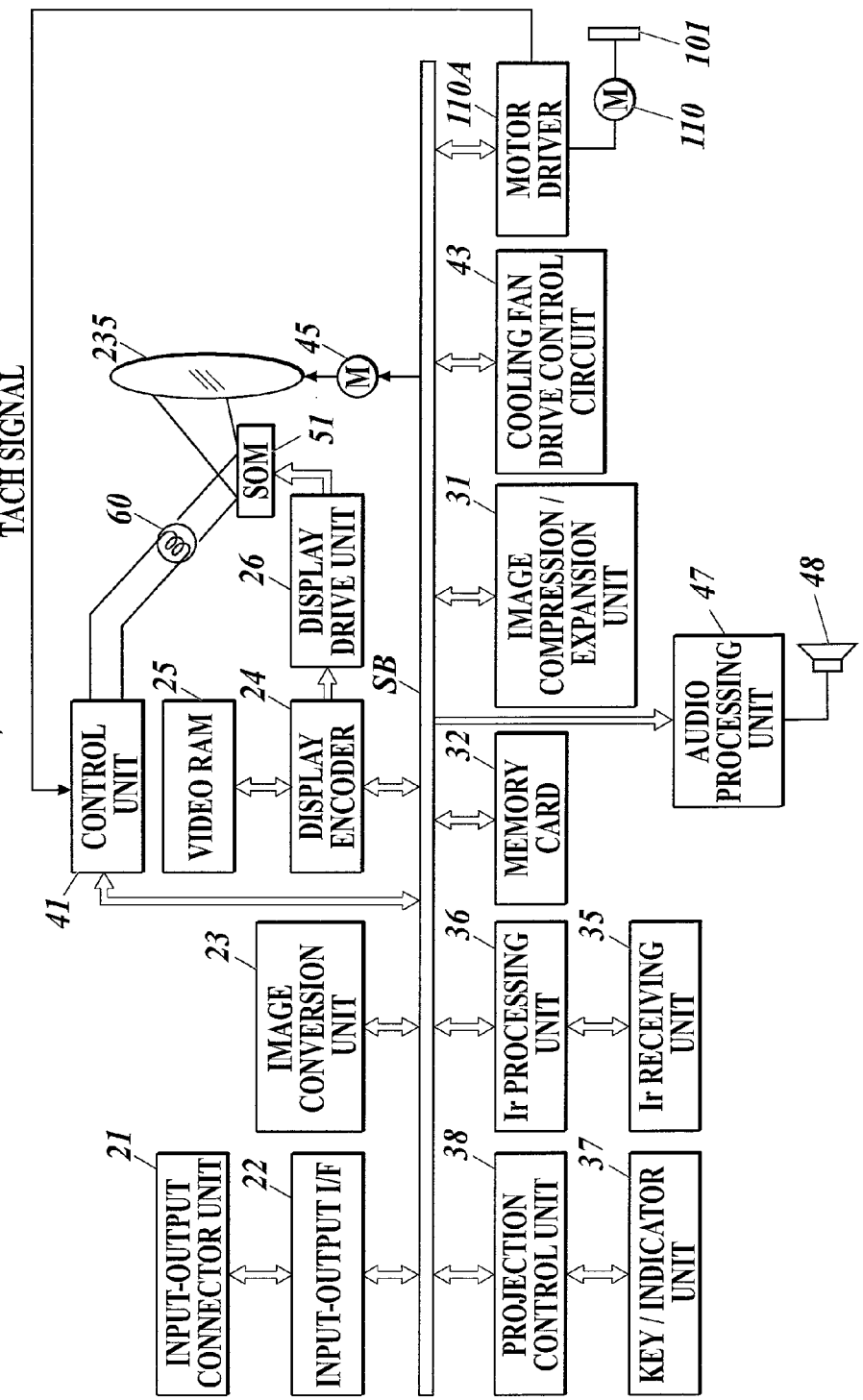
FIG. 2 shows a functional circuit block of the projection apparatus provided with the light source unit according to the first embodiment.

Next, a control unit of the projection apparatus 10 will be described with reference to the block diagram of FIG. 2.

The control unit includes a projection control unit 38, an input-outputs interface 22, an image conversion unit 23, a display encoder 24, a display drive unit 26, etc. Image signals of various standards which are input from the input-output connector unit 21 go through the input-output interface 22 and the system bus (SB), and they are converted in the image conversion unit 23 so as to be unified to image signals of a predetermined format suited for display. Thereafter, the image signals are output to the display encoder 24. The frequency of an input image signal may be used as it is in display or may be converted appropriately to prevent tearing. The frequency of an image signal at the time of display is referred to as a display frequency.

The display encoder 24 opens and stores an input image signal in the video RAM 25, generates a video signal from the content stored in the video RAM 25 and outputs the generated video signal to the display drive unit 26.

The display drive unit 26 functions as a display element control unit.

In particular, on the basis of the control of the projection control unit 38, the display drive unit 26 drives the display element 51 which is a spatial light modulator (SOM) at an appropriate frame rate corresponding to the image signal output from the display encoder 24. The display drive unit 26 emits a bundle of rays which is emitted from the light source unit 60 to the display element 51 via a light guiding optical system and forms an optical image with reflection light from the display element 51. Then, the display drive unit 26 performs a projection display of an image on a screen (not shown in the drawing) via the after-mentioned projection side optical system. Here, the moveable lens group 235 of the projection side optical system is driven by the lens motor 45 to perform zoom adjustment and focus adjustment.

The image compression/expansion unit 31 performs data compression on brightness signals and color difference signals of image signals by a process such as ADCT, Huffman coding or the like and performs storage processing of sequentially writing the compressed data in a memory card 32 which is a detachable recording medium. Further, the image compression/expansion unit 31 performs a process to enable display of a video or the like on the basis of image data stored in the memory card 32 by reading out image data recorded in the memory card 32 at the time of replay mode, expanding the pieces of image data constituting a series of video in one frame unit and outputting the expanded image data to the display encoder 24 via the image conversion unit 23.

The projection control unit 38 controls operation of individual circuits in the projection apparatus 10. The projection control unit 28 includes a CPU, a ROM in which operation programs such as various settings are fixedly stored, a RAM which is used as a work memory, etc.

Operation signals of the key/indicator unit 37, which includes a main key, indicators, etc., which is provided at the upper panel 11 of the case are directly transmitted to the projection control unit 38. Key operating signals from a remote control are received at the Ir receiving unit 35 and code signals which are decoded at the Ir processing unit 36 are output to the projection control unit 38.

The audio processing unit 47 is connected to the projection control unit 38 via the system bus (SB). The audio processing unit 47 is provided with an audio source circuit such as a PCM audio source. At the time of projection mode and replay mode, the audio processing unit 47 converts audio data into analog signals and loudly emits the audio by driving the speaker 48.

Further, the projection control unit 38 controls the control unit 41 which is the control unit according to the present invention. The control unit 41 individually controls light emission of the excitation light emission device, the red light source device and the blue light source device of the light source unit 60 so that light of a predetermined wavelength band required at the time of image generation is emitted from the light source unit 60. The control unit 41 controls the motor driver 110A via the system bus (SB) and rotates the wheel motor 110 so as to synchronize (the detail will be described later).

The projection control unit 38 further makes the cooling fan drive control unit 43 perform temperature detection by a plurality of temperature sensors provided in the light source unit 60 to control the rotation speed of the cooling fans according to the results of the temperature detection. Furthermore, the projection control unit 38 makes the cooling fan drive control unit 43 continue with rotation of the cooling fans, by a timer or the like, even after the power of the projector main body is turned off. Alternatively, the projection control unit 38 controls so as to turn the power of the projector main body off depending on the results of temperature detection by the temperature sensors, for example.

Next, the inside structure of the projection apparatus 10 will be described.

Figure 3:
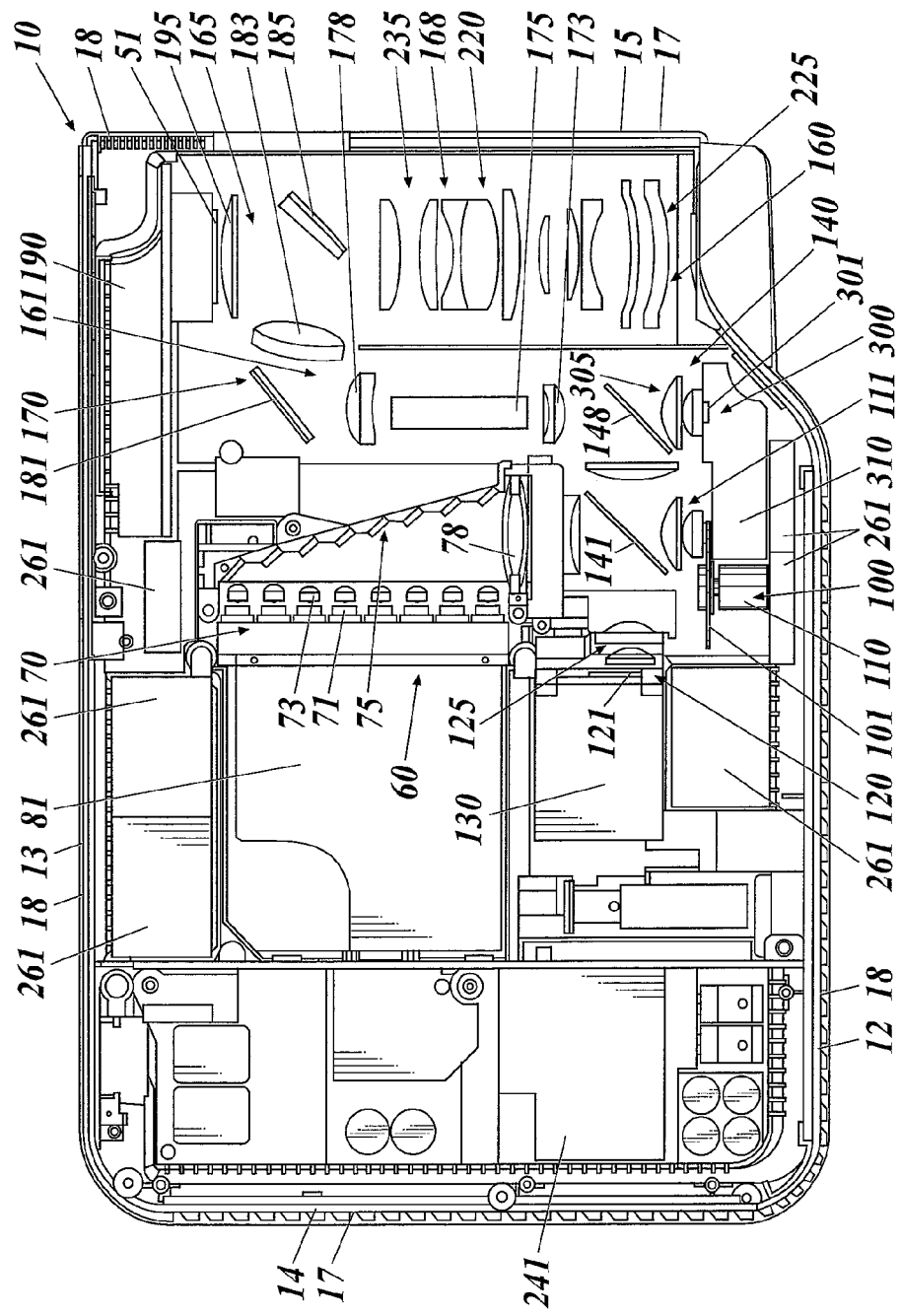
FIG. 3 shows a plan perspective view of the inside structure of the projection apparatus provided with the light source unit according to the first embodiment.

FIG. 3 is a plane perspective view of the inside structure of the projection apparatus 10. As shown in FIG. 3, the projection apparatus 10 includes a control unit base 241 near the right panel 14. The control unit base 241 includes a power source circuit block, a light source control block, etc. The projection apparatus 10 is provided with the light source unit 60 at a side of the control unit base 241, that is, at approximately center part of the projector case. Further, the projection apparatus 10 includes an optical system unit 160 between the light source unit 60 and the left panel 15.

The light source unit 60 includes the excitation light emission device 70, a fluorescence emission device 100, the blue light source device 300, the red light source device 120 and a light source side optical system 140. The excitation light emission device 70 is arranged at approximately center part in the left-right direction of the projector case and near the back panel 13. The fluorescence emission device 100 is arranged on the light axis of the bundle of rays which is emitted from the excitation light emission device 70 and near the front panel 12. The blue light source device 300 is arranged near the front panel 12 so as to be parallel to the bundle of rays which is emitted from the fluorescence emission device 100. The red light source device 120 is arranged between the excitation light emission device 70 and the fluorescence emission device 100. The light source side optical system 140 converts each light axis of the emission light from the fluorescence emission device 100, the emission light from the red light source 120 and the emission light from the blue light source device 300 so as to be the same light axis and collects the color lights at the incident port of the light tunnel 175 which is a predetermined surface.

The excitation light emission device 70 includes an excitation light source 71, a group of reflection mirrors 75, a collecting lens 78 and a heat sink 81. The excitation light source 71 is arranged so that light axes therefrom are parallel to the back panel 13. The reflection mirrors of the group of reflection mirrors 75 convert the light axes of the emission light from the excitation light source 71 by 90 degrees toward the front panel 12. The collecting lens 78 collects the emission light from the excitation light sources 71 which reflected off the reflection mirrors of the group of reflection mirrors 75. The heat sink 81 is arranged between the excitation light sources 71 and the right panel 14.

With respect to the excitation light sources 71, a plurality of blue laser diodes are arranged in matrix and collimator lenses 73 which convert the excitation light emitted from the blue laser diodes into parallel light are respectively arranged on the light axes of the blue laser diodes. With respect to the group of reflection mirrors 75, a plurality of reflection mirrors are arranged in a step manner and they reduce the cross section areas of the bundles of rays which are emitted from the excitation light sources 71 in one direction and emits the reduced bundles of rays toward the collecting lens 78.

A cooling fan 261 is arranged between the heat sink 81 and the back panel 13, and the excitation light sources 71 are cooled by the cooling fan 261 and the heat sink 81. Further, a cooling fan 261 is also arranged between the group of reflection mirrors 75 and the back panel 13, and the group of reflection mirrors 75 and the collecting lens 78 are cooled by the cooling fan 261.

The fluorescence emission device 100 includes a fluorescent wheel 101, a wheel motor (drive unit) 110 and a group of collecting lenses 111. The fluorescent wheel 101 is arranged so as to be parallel with the front panel 12, that is, to be orthogonal to the light axis of the emission light from the excitation light emission device 70. The wheel motor (drive unit) 110 rotates the fluorescent wheel 101 in the circumferential direction. The group of collecting lenses 111 collects a bundle of rays which is emitted from the fluorescent wheel 101 toward the back panel 13. With respect to the wheel motor 110, the control unit 41 obtains a rotation frequency of the wheel motor 110, that is, a rotation frequency of the fluorescent wheel 101 on the basis of pulses of number of rotation such as a TACH signal, for example, output from the motor driver 110 which is the drive (control) circuit. Further, on the basis of the current rotation frequency of the fluorescent wheel 101, the control unit 41 sets the target rotation frequency of the fluorescent wheel 101 thereafter.

Figure 4A:
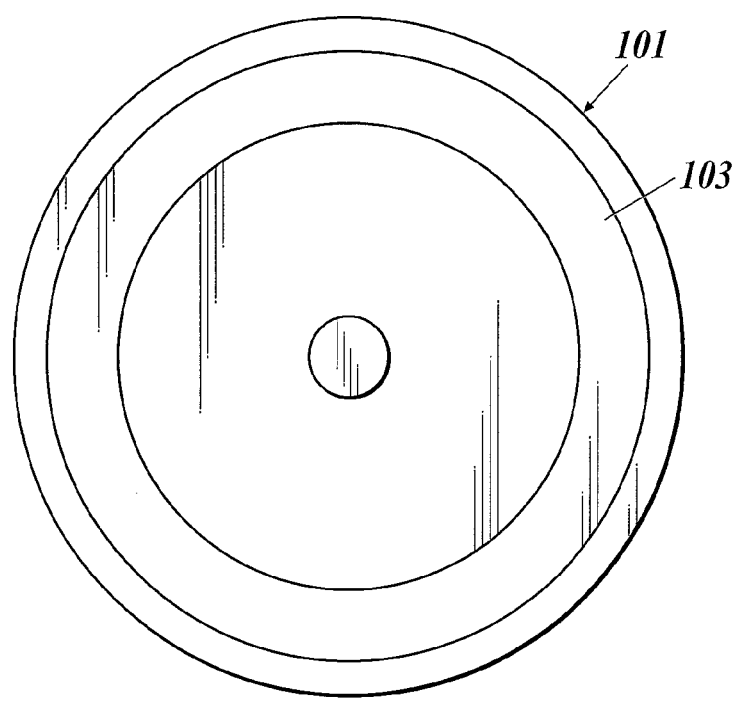
FIG. 4A is a front perspective view of a fluorescent wheel according to the first embodiment.
Figure 4B:
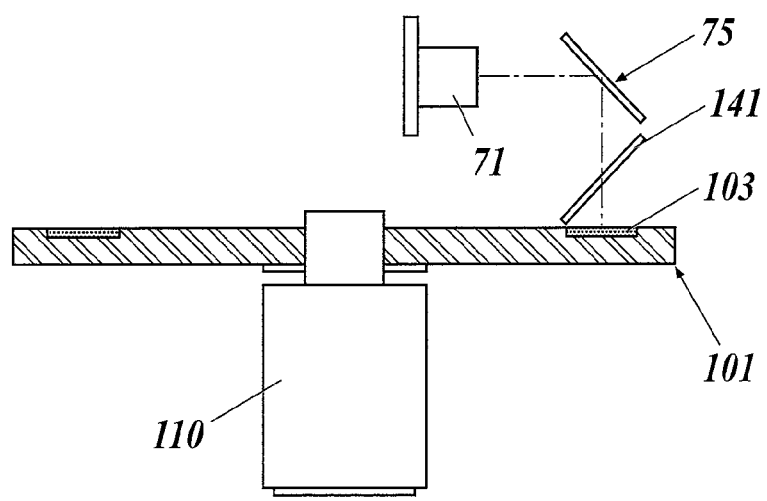
FIG. 4B is a plan perspective view of a partial cross section of the fluorescent wheel according to the first embodiment.

As shown in FIG. 4A, the fluorescent wheel 101 is a metallic material in a circular plate shape and functions as a fluorescent plate which performs fluorescence emission upon receiving excitation light. In particular, a ring shaped fluorescence emission region, which converts the excitation light from the excitation light sources 71 into fluorescence light of green wavelength band, is formed as a concave unit in the fluorescent wheel 101. Further, on the surface of the fluorescent wheel 101 including the fluorescence emission region facing the excitation light sources 71, a reflection surface which reflects light is formed by mirror processing such as silver deposition. A green fluorescent layer 103 is laid on the reflection surface.

The emission light from the excitation light emission device 70 which is emitted toward the green fluorescent layer 103 of the fluorescent wheel 101 excites the green fluorescent of the green fluorescent layer 103, and the bundle of fluorescence light emitted from the green fluorescent in all directions is emitted toward the excitation light sources 71 directly or toward the excitation light sources 71 after being reflected off the reflection surface of the fluorescent wheel 101. Further, the excitation light which is emitted on the metallic member without being absorbed by the fluorescent of the fluorescent layer 103 reflects off the reflection surface and enters the fluorescent layer 103 again and excites the fluorescent layer 103. Therefore, by making the surface of the concave unit of the fluorescent wheel 101 be the reflection surface, the usage efficiency of the excitation light emitted from the excitation light sources 71 can be improved and brighter light emission can be realized.

Here, the excitation light which is emitted toward the excitation light sources 71 without being absorbed by the fluorescent among the excitation light reflected off the reflection surface of the fluorescent wheel 101 toward the fluorescent layer 103 transmits through the after-mentioned first dichroic mirror 141 and the fluorescence light is reflected off the first dichroic mirror 141. Therefore, the excitation light is not emitted outside. Further, as shown in FIG. 3, a cooling fan 261 is arranged between the wheel motor 110 and the front panel 12, and the fluorescent wheel 101 is cooled by the cooling fan 261.

The red light source device 120 includes a red light source 121 which is disposed so that the light axis therefrom is parallel with the excitation light sources 71 and a group of collecting lenses 125 which collect the emission light from the red light source 121. The red light source device 120 is arranged so that the light axis thereof intersects the emission light from the excitation light emission device 70 and the light of green wavelength band emitted from the fluorescent wheel 101. Further, the red light source 121 is a red light-emitting diode, as a semiconductor light emitting element, which emits light of red wavelength band. The red light source device 120 further includes a heat sink 130 arranged on the right panel 14 side of the red light source 121. A cooling fan 261 is arranged between the heat sink 130 and the front panel 12, and the red light source 121 is cooled by the cooling fan 261.

The blue light source device 300 includes a blue light source 301 which is arranged so as to be parallel with the light axis of the emission light from the fluorescence emission device 100 and the group of collecting lenses 305 which collect the emission light from the blue light source 301. The blue light source device 300 is arranged so that the light axis therefrom intersects the emission light from the red light source device 120. Further, the blue light source 301 is a blue light-emitting diode, as a semiconductor light emitting element, which emits light of blue wavelength band. The blue light source device 300 further includes a heat sink 310 which is arranged on the front panel 12 side of the blue light source 301. A cooling fan 261 is arranged between the heat sink 310 and the front panel 12 and the blue light source 301 is cooled by the cooling fan 261.

The light source side optical system 140 includes a collecting lens which collects the bundles of rays of the red wavelength band, the green wavelength band and the blue wavelength band, a dichromic mirror which converts the light axes of the bundles of rays of individual wavelength bands to have the same light axis, etc.

In particular, at the position where the light axis of the light of red wavelength band which is emitted from the red light source device 102 intersects the light axes of the light of blue wavelength band which is emitted from the excitation light emission device 70 and the light of green wavelength band which is emitted from the fluorescent wheel 101, the first dichroic mirror 141 which allows the light of blue wavelength band and the light of red wavelength band transmit therethrough and which reflects the light of green wavelength band to convert the light axis of the green light by 90 degrees toward the left panel 15 is disposed.

Further, at the position where the light axis of the light of blue wavelength band which is emitted from the blue light source device 300 intersects with the light axis of the light of red wavelength band which is emitted from the red light source device 120, the second dichromic mirror 148 which allows the light of blue wavelength band transmit therethrough and which reflects the light of green wavelength band and the light of red wavelength band to convert the light axes of green light and red light by 90 degrees toward the back panel 13 is disposed. Between the first dichromic mirror 141 and the second dichromic mirror 148, a collecting lens is disposed.

The optical system unit 160 is formed in an approximately U shape with three blocks which are a lighting side block 161 which is positioned on the left side of the excitation light emission device 70, an image generation block 165 which is positioned near where the back panel 13 intersects with the left panel 15 and a projection side block 168 which is positioned between the light source side optical system 140 and the left panel 15.

The lighting side block 161 includes a part of the light guiding optical system 170 which guides the light from the light source which is emitted from the light source unit 60 to the display element 51 in the image generation block 165. The light guiding optical system 170 in the lighting side block 161 includes the light tunnel 175 which makes the bundle of rays emitted from the light source unit 60 be a light bundle having even intensity distribution, a collecting lens 173 which collects the light from the light source at the incident surface of the light tunnel 175, a collecting lens 178 which collects the light emitted from the light tunnel 175, a light axis conversion mirror 181 which converts the light axis of the bundle of rays emitted from the light tunnel 175 toward the image generating block 165, etc.

As the light guiding optical system 170, the image generation block 165 includes a collecting lens 183 which collects the light from the light source which reflected off the light axis conversion mirror 181 at the display element 51 and an emission mirror 185 which emits the bundle of rays which transmitted through the collecting lens 183 to the display element 51 at a predetermined angle. The image generation block 165 includes a DMD which is the display element 51, and a heat sink 190 for cooling the display element 51 is arranged between the display element 51 and the back panel 13. The display element 51 is cooled by the heat sink 190. Further, near the front of the display element 51, a collecting lens 195 as the projection side optical system 220 is disposed.

The projection side block 168 includes a group of lenses of the projection side optical system 220 which emit the "on" light which is reflected off the display element 51 to a screen. A group of fixed lenses 225 arranged inside a fixed lens barrel and a group of movable lenses 235 arranged inside a movable lens barrel are provided as the projection side optical system 220. These are varifocal lenses with zoom function, and zoom adjustment and focus adjustment can be carried out by moving the group of movable lenses 235 by a lens motor.

Next, controlling of the excitation light emission device 70, the red light source device 120 and the blue light source device 300 by the control unit 41 will be described.

The control unit 41 controls flashing of the excitation light emission device 70, the red light source device 120 and the blue light source device 300 individually and in a time-shared manner. In such way, composite light or monochromatic light can be emitted from the light source unit 60.

In particular, as shown in FIG. 5, the control unit 41 can control the red light source device 120, the excitation light emission device 70 and the blue light source device 300 so as to be lit separately and sequentially in one frame so as to include time periods where the light of red wavelength band, the light of green wavelength band and the light of blue wavelength band are emitted respectively and separately.

In such way, at the time when only the red light source device 120 is lit, the red light enters the light tunnel 175 via the light source side optical system 140. At the time when only the excitation light emission device 70 is lit, by the excitation light being emitted to the fluorescent wheel 101 of the fluorescence emission device 100, the green light which is emitted from the fluorescent wheel 101 enters the light tunnel 175 via the light source side optical system 140. At the time when only the blue light source device 300 is lit, the blue light enters the light tunnel 175 via the light source side optical system 140. In other words, the light source unit 60 makes the excitation light emission device 70 and the two types of light source devices 120 and 130 emit light individually so that monochromatic lights of individual colors (red, green, blue) are sequentially emitted. Then, by the DMD which is the display element 51 of the projection apparatus 10 displaying the lights of individual colors in a time-shared manner according to data, the control unit 41 can project a color image on a screen.

Further, since the control unit 41 can control light emission of the excitation light emission device 70 and the two types of light source devices 120 and 300 individually, the control unit 41 can control the excitation light emission device 70 and the two types of light source devices 120 and 300 so as to light any two or three of them during a predetermined time period. In other words, as shown in FIG. 6A, the control unit 41 can control to light all of the red light source device 120, the excitation light emission device 70 and the blue light source device 300 so as to include a time period where light of white wavelength band is to be emitted by the lights of red wavelength band, green wavelength band and blue wavelength band being combined. Further, as shown in FIG. 6B, by the control unit 41 lighting the excitation light emission device 70 while the red light source device 120 is being lit, the red light source device 120 and the excitation light emission device 70 can be controlled so that their lighting periods overlap.

In such way, the light source unit 60 can generate and emits light of white wavelength band which is a composite light in addition to monochromatic lights of red, green and blue. That is, the light source unit 60 can sequentially emit lights of red wavelength band, white wavelength band, green wavelength band and blue wavelength band.

Further, the light source unit 60 can generate and emit light of yellow wavelength band which is a composite light of red and green lights. That is, the light source unit 60 can sequentially emit lights of red wavelength band, yellow wavelength band, green wavelength band and blue wavelength band.

Therefore, by the DMD which is the display element 51 of the projection apparatus 10 displaying lights of individual colors in a time-shared manner according to data, a color image of high brightness can be generated on a screen.

Next, speed controlling of the wheel motor 110 which is executed by the control unit 41 at the time of image projection will be described.

The control unit 41 executed a predetermined program at the time of speed control processing of the wheel motor 110.

Figure 7:
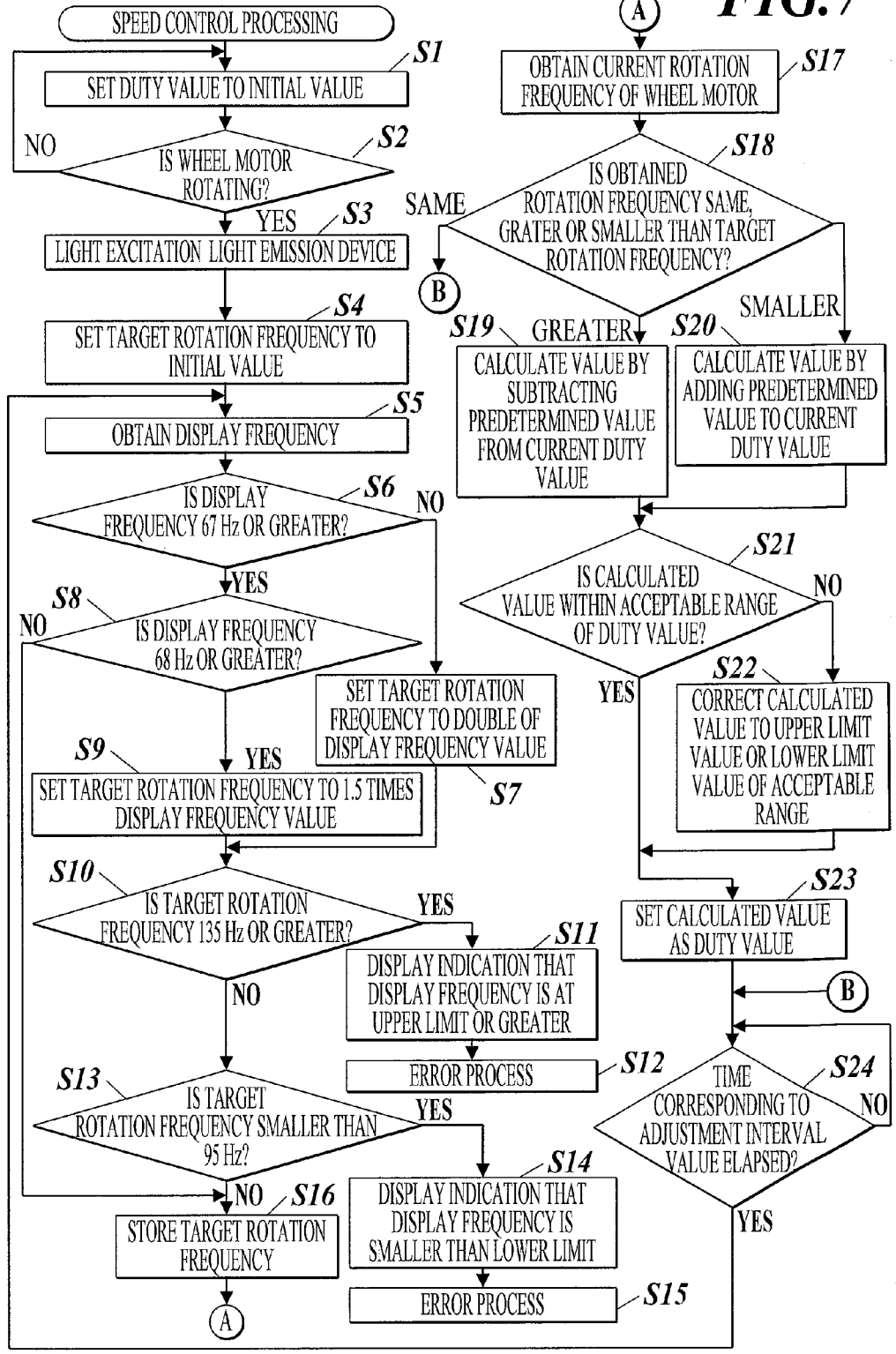
FIG. 7 is a flowchart showing a flow in speed control processing according to the first embodiment.

FIG. 7 is a flowchart showing a flow in the speed control processing. When performing the speed control processing of the wheel motor 110, the control unit 41 varies a parameter value for changing the electric current of the wheel motor 110 to change the rotation frequency of the wheel motor 110. As for a parameter value, a duty value based on duty which is a pulse width ratio with respect to a pulse signal cycle is suggested, for example. If the duty value is small, the rotation frequency of the wheel motor 110 is small, and if the duty value is large, the rotation frequency of the wheel motor 110 is large. Here, the duty value (duty controlling value) is not the duty (% value) which is the above mentioned width ratio itself, and the duty value has a positive correlation with duty.

In step S1 of FIG. 7, the control unit 41 sets the duty value to the initial value to rotate the wheel motor 110. In step S2, the control unit 41 determines whether the wheel motor 110 is rotating on the basis of a TACH signal from the motor driver 110A. If the control unit 41 determines that the wheel motor 110 is not rotating, the processing returns to step S1. If the control unit 41 determines that the wheel motor 110 is rotating, the processing moves on to step S3.

In step S3, the control unit 41 lights the excitation light emission device 70 to emit excitation light to the fluorescent wheel 101. In step S4, the control unit 41 sets the target rotation frequency of the wheel motor 110 to the initial value (for example, 120 Hz). In step S5, the control unit 41 obtains a display frequency from the image conversion unit 23.

In step S6, the control unit 41 determines whether the obtained display frequency is 67 Hz or greater. If the determination result is that the obtained display frequency is smaller than 67 Hz, the processing moves on to step S7. If the determination result is that the obtained display frequency is 67 Hz or greater, the processing moves on to step S8. In step S7, the control unit 41 decides the target rotation frequency to be double the display frequency value.

In step S8, the control unit 41 determines whether the obtained display frequency is 68 Hz or greater. If the determination result is that the obtained display frequency is 68 Hz or greater, the processing moves on to step S9. If the determination result is that the obtained display frequency is smaller than 68 Hz, the processing moves on to step S16. In step S9, the control unit 41 decides the target rotation frequency to be 1.5 times the display frequency value.

In step S10, the control unit 41 determines whether the target rotation frequency is 135 Hz or greater. If the determination result is that the target rotation frequency is 135 Hz or greater, the processing moves on to step S11. If the determination result is that the target rotation frequency is smaller than 135 Hz, the processing moves on to step S13. This value of 135 Hz is the upper limits value of the frequency range for stable rotation where the wheel motor 110 can be operated stably. Therefore, if the upper limit value of the frequency range for stable rotation is a value other than 135 Hz depending of the type of the wheel motor 110, such upper limit value can be used as the threshold in step S10.

In step S11, the control unit 41 gives instruction to the projection control unit 38 so as to display an indication of "current display frequency is at the upper limit or greater". In such way, a user is encouraged to lower the display frequency.

In step S12, a user performs an error process on the basis of the displayed content. In particular, the display frequency is to be adjusted so as to be within the frequency range for stable rotation. During the error process, the speed control processing is temporarily terminated.

In step S13, the control unit 41 determines whether the target rotation frequency is smaller than 95 Hz. If the determination result is that the target rotation frequency is smaller than 95 Hz, the processing moves on to step S14. If the determination result is that the target rotation frequency is 95 Hz or greater, the processing moves on to step S16. This value of 95 Hz is the lower limit value of the frequency range for stable rotation. Therefore, if the lower limit value of frequency range for stable rotation is a value other than 95 Hz depending of the type of the wheel motor 110, such lower limit value can be used as the threshold in step S13.

In step S14, the control unit 41 gives instruction to the projection control unit 38 so as to display an indication of "current display frequency is smaller than the lower limit". In such way, a user is encouraged to raise the display frequency. That is, the projection control unit 38 is the informing unit according to the present invention.

In step S15, a user performs an error process on the basis of the displayed content. During this error process, the speed control processing is also temporarily terminated.

In step S16, the control unit 41 stores (saving the setting) the target rotation frequency. In particular, if the processing is branched to step S7 in the flow and step S7 is performed, the control unit 41 stores the value which is double the display frequency as the target rotation frequency. Further, if the processing branched to step S9 in the flow and step S9 is performed, the control unit 41 stores the value which is 1.5 times the display frequency as the target rotation frequency. Furthermore, if the result of step S8 is NO, the control unit 41 carries on and stores the last target rotation frequency.

In step S17, the control unit 41 obtains the current rotation frequency of the wheel motor 110 on the basis of a TACH signal from the motor driver 110A.

In step S18, the control unit 41 determines whether the rotation frequency obtained in step S17 is greater or smaller comparing to the target rotation frequency stored in step S16. If it is determined that the rotation frequency and the target rotation frequency are the same, the processing moves on to step S24. If it is determined that the rotation frequency is greater than the target rotation frequency, the processing moves on to step S19. If it is determined that the rotation frequency is smaller than the target rotation frequency, the processing moves on to step S20.

In step S19, the control unit 41 calculates a value by subtracting a predetermined value from the current duty value. In step S20, the control unit 41 calculates a value by adding a predetermined value to the current duty value. In step S21, the control unit 41 determines whether the value calculated in step S19 or step S20 is within the acceptable range of duty value. If the determination result is that the value is within the acceptable range, the processing moves on to step S23. If the determination result is that the value is outside the acceptable range, the processing moves on to step S22.

In step S22, if the calculated value exceeds the acceptable range, the control unit 41 corrects the value so as to be the upper limit value of the acceptable value, and if the calculated value is below the acceptable range, the control unit 41 corrects the value so as to be the lower limit value of the acceptable range.

In step S23, the control unit 41 sets the calculated value as the duty value. In such way, the wheel motor 110 is controlled to rotate at the rotation frequency based on the duty value.

In step S24, the control unit 41 determines whether time corresponding to a predetermined adjustment interval value elapsed. If it is determined that the time corresponding to a predetermined adjustment interval value has not elapsed, step S24 is repeated until the time elapses. If it is determined that the time corresponding to a predetermined adjustment interval elapsed, the processing moves on to step S5. Here, an adjustment interval value is a value for appropriately carrying out the speed control of the wheel motor 110, and for example, 1 second is applied as an adjustment interval value in the embodiment.

When the speed control processing is executed, the rotation frequency of the fluorescent wheel 101 also changes so at to converge to the target rotation frequency which is double or 1.5 times the display frequency.

Figure 8:
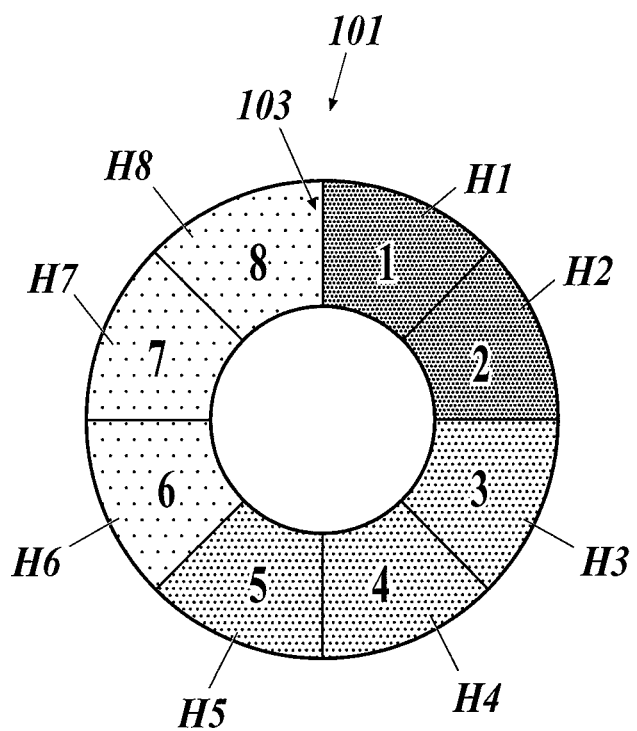
FIG. 8 is an image figure showing unevenness of a green fluorescent layer in a fluorescent wheel according to the first embodiment.

FIG. 8 is an image showing unevenness of the green fluorescence layer 103 in the fluorescent wheel 101. FIG. 8 shows a case where the green fluorescent layer 103 is divided in eight sections in its circumference direction and the fluorescent layer 103 in the first region H1 and the second region H2 has the highest density level, the fluorescent layer 103 in the third region H3, the fourth region H4 and the fifth region H5 has a density level next to the first region H1 and the second region H2, and the fluorescent layer 103 in the sixth region H6, the seventh region H7 and the eighth region H8 has the lowest density level as an example.

FIG. 9A is a timing chart showing excitation light emission timing and rotation timing of the fluorescent wheel 101, and shows a case where the fluorescent wheel 101 rotates at the rotation frequency which is double the display frequency. FIG. 9B shows a case where the fluorescent wheel 101 rotates at the rotation frequency which is 1.5 times the display frequency. Here, excitation light is emitted from the excitation light emission device 70 on the basis of a green image signal (pulse signal) based on the display frequency.

As shown in FIG. 9A, when the fluorescent wheel 101 rotates at the rotation frequency which is double the display frequency, the fluorescent wheel 101 rotates twice (makes two cycles) during 1 pulse of an image signal. Therefore, at the time of emission of excitation light, excitation light is emitted to the first region H1, the second region H2 and the third region H3, every time. That is, since excitation light is emitted to the same region in the fluorescent wheel 101 when excitation light is to be emitted, green light intensity does not vary temporally even if the green fluorescent layer 103 is not even, and a user who watches a projected image does not realize the unevenness.

On the other hand, as shown in FIG. 9B, when the fluorescent wheel 101 rotates at the rotation frequency which is 1.5 times the display frequency, the fluorescent wheel 101 rotates there times (makes three cycles) during two pulses of an image signal. Therefore, at the time of emission of excitation light, excitation light is emitted to the first region H1, the second region H2 and the third region H3 in the odd number pulse signals. Further, at the time of emission of excitation light, excitation light is emitted to the fifth region H5, the sixth region H6 and the seventh region H7 in the even number pulse signals. That is, at the time of emission of excitation light, excitation light is emitted to the same region in the odd number pulse signals and excitation light is emitted to the same region in the even number pulse signals, although the regions to which excitation light is emitted are different between the odd number pulse signals and the even number pulse signals. Therefore, green light intensity can be prevented from varying temporally comparing to a case where the excitation light is emitted to different part in every cycle, and a user who watches a projected image does not easily realize the unevenness.

As described above, since the fluorescent wheel 101 rotates at the rotation frequency which is double or 1.5 times the display frequency according to the embodiment, temporal variation of green light intensity can be controlled even if the green fluorescent layer 103 is uneven. Therefore, according to the embodiment, influence of unevenness on a projected image can be controlled and the projected image can be stabilized. Here, it is sufficient that the display frequency and the rotation frequency fulfill following formula (1).

$$j \times \text{display frequency} = k \times \text{rotation frequency } (j, k \text{ are integers}, j > k) \quad (1)$$

That is, a rotation frequency is a value obtained by multiplying a display frequency by j/k. In such way, the lighting timing of excitation light and the rotation timing of the fluorescent wheel 101 can be synchronized by a coefficient of j/k. Further, temporal variation of green light intensity can be controlled more comparing to a case where excitation light is emitted to difference part in every cycle.

Further, if the j/k value is an integer, excitation light is emitted to the part which is the same region in any rotation as shown in FIG. 9A. Therefore, temporal variation of green light intensity can be controlled the most.

Furthermore, if the j/k value is 1.5, excitation light is emitted to the same region in the odd number pulse signals and excitation light is emitted to the same region in the odd number pulse signals although the regions are different between the odd number pulse signals and the even number pulse signals as shown in FIG. 9B. Since excitation light is emitted to two parts, the two parts being the regions where excitation is emitted (excitation light is emitted in two different ways), temporal variation of green light intensity can be controlled as much as possible.

If the j/k value is 1.33 . . . or 1.25, for example, parts where excitation light is emitted will be three parts or four parts, respectively (not shown in the drawing). In such way, it is preferred that values of j and k are selected so that the parts where excitation light is emitted are as less as possible.

Since the j/k value is decided so as to be within the frequency range of stable rotation of the wheel motor 110, the wheel motor 110 can be driven stably while controlling temporal variation of green light intensity.

In other words, since the j/k value can be switched appropriately to 1.5 or 2, although the range of display frequency is broad to some extent, the range of the rotation frequency obtained by multiplying the display frequency by the j/k value can be made narrower than the range of the display frequency in terms of ratio of the upper limit and the lower limit. Thus, the rotation frequency can be within the frequency range for stable rotation. In particular, in a case where the current display frequency is smaller than a predetermined value, the larger j/k value (j/k=2) is selected, and in a case where the current display frequency is a predetermined value or greater, the smaller j/k value (j/k=1.5) is selected. Therefore, the rotation frequency obtained by multiplying the display frequency by either of the values can be within the frequency range of stable rotation, and by applying 1.5 or 2 as the j/k value, temporal variation of green light intensity can be controlled.

In a case where a predetermined value does not have any kind of range, that is, in a case where the j/k value is to be switched according to the comparison with one threshold, if an input frequency (display frequency) fluctuates to some extent, the rotation frequency also switches accordingly. This is not preferable. Therefore, in the embodiment, a predetermined value has a predetermined range (for example, 67 Hz to 68 Hz), and if the current display frequency is below the lower limit value of the predetermined range, the larger j/k value (j/k=2) is selected, if the current display frequency is the upper limit value of the predetermined range or greater, the smaller j/k value (j/k=1.5) is selected and if the current display frequency is within the predetermined range, the last target rotation frequency is carried on. Therefore, the rotation frequency can be prevented from varying frequently. As for a predetermined range of the predetermined value, for example, 67 Hz to 68 Hz which is most unlikely to be used as a standard for input frequency is selected.

Further, varying direction of input frequency may also be monitored and may be switched with an appropriate hysteresis property. In particular, the current display frequency is compared with the first threshold and the second threshold which is greater than the first threshold. If the current display frequency varies so as to be smaller than the first threshold, a combination of j value and k value for the large j/k value is selected. If the current display frequency varies so as to be greater than the second threshold, a combination of j value and k value for the small j/k value is selected. By having such hysteresis property, the rotation frequency variation due to the target rotation frequency changing frequently can be prevented.

FIG. 10 is a table showing an example of a relation between a display frequency and a target rotation frequency decided by the speed control processing of the embodiment.

Here, the frequency range for stable rotation of the wheel motor 110 is 135 Hz to 95 Hz. As shown in FIG. 10, if the display frequency is 85 Hz (high frequency range), the smaller value 1.5 is selected for the j/k value and the target rotation frequency is 127.5 Hz. Similarly, if the display frequency is 75 Hz (high frequency range), 1.5 is selected for the j/k value and the target rotation frequency is 112.5 Hz. In such way, the rotation frequency does not exceed the upper limit of the frequency range of stable rotation. Further, if the display frequency is 67 Hz or greater and smaller than 68 Hz, the last target rotation frequency is carried on. If the display frequency is 60 Hz (low frequency range), the larger value 2 is selected for the j/k value and the target rotation frequency is 120 Hz. If the display frequency is 50 Hz (low frequency range), 2 is similarly selected for the j/k value and the target rotation frequency is 100 Hz. In such way, the rotation frequency does not be below the lower limit of the frequency range for stable rotation.

In a case where the j/k value is limited to 1.5 or 2, for example, and where the j/k value cannot be decided so that the rotation frequency is within the frequency range for stable rotation, an indication notifying that the rotation frequency will not be within the frequency range of stable rotation is informed. Therefore, a user can respond according to such indication.

The present invention is not limited to the above described embodiment, and can be changed and modified freely within the scope of the invention.

In the embodiment, an example of a single panel projection apparatus which lights the excitation light sources 71 in a time-shared manner is described. However, for example, such emission of excitation light is also applied to a three-panels (multiple-panels) projection apparatus which is provided with three plates of display elements. Therefore, the configuration of the present invention can be preferably used.

Further, the control unit 41 may be provided separately in the light source unit 60 and not in the projection apparatus 10. Further, layout of each optical system is not limited to what is described above, and may adapt various configurations.

In the above embodiment, a dichroic mirror is used to convert a light axis direction and to select between transmission and reflection according to a wavelength. However, this is not limitative in any way. For example, the dichroic mirror may be replaced with another alternative means such as a dichroic prism.

Further, in the embodiment, the light source unit 60 is configured by including the excitation light emission device 70 and a red light source device 120 and a blue light source device 300 as the two types of light source devices. However, this is not limitative in any way. For example, light source devices which emits lights of complementary color wavelength bands such as yellow and cyan can be added. Furthermore, the excitation light sources 71 of the excitation light emission device 70 are not limited to those which emit light of blue wavelength band. For example, laser diodes which emit excitation light of ultraviolet region may be used as the excitation light sources 71.

It is preferred that the control unit 41 decides the j/k so that the display frequency is within the range of displayable frequency of the display element 51. In such way, a suitable display can be carried out without degrading half-tone resolution of the display element 51.

Further, in a case where the j/k value is limited to 1.5 or 2, for example, and where the j/k cannot be decided so that the display frequency is within the range of displayable frequency, the control unit 41 may control the projection control unit 38 to inform that the display frequency will not be within the displayable frequency range. A use can respond according to such information.

Further, in the embodiment, a case where j and k are indirectly decided by switching the j/k value (1.5 or 2) is described as an example. However, the control unit 41 may decide j and k individually as long as the relation shown in formula (1) is fulfilled. If the j/k value is to be 1.5, j is decided to 3 and k is decided to 2, for example. On the other hand, if the j/k value is to be 2, j is decided to 2 and k is decided to 1, for example. Further, as for the j/k value, not only two types but also three types or more can be used. In such case, the control unit 41 may decide j and k individually so as to correspond to the j/k values of three types or more.

In the embodiment, an example where the rotation frequency (speed) is obtained by a TACH signal is described. However, the rotation frequency may be obtained by using a marker on a wheel and a photo sensor which detects the marker. In such configuration, since the rotation position (phase) can also be obtained in addition to the rotation frequency (speed), such configuration may be applied to not only the fluorescent wheel on which a fluorescent layer is arranged over the entire cycle on the surface described in the embodiment but also to a fluorescent wheel on which a fluorescent layer is arranged only for a specific angle range.

In the embodiment, an example where an error process is performed in a case where the target rotation frequency is outside the frequency range for stable rotation of the wheel motor 110 is described. However, in a case where the target rotation frequency is outside the frequency range for stable rotation, the target rotation frequency may be set to be the upper limit or the lower limit of the frequency range for stable rotation and controlled. In such case, display (projection) itself can be carried out although unevenness is readily recognized similarly in a conventional case.

Second Embodiment

In the first embodiment, when the j/k value is 1.5, excitation light is emitted to the same region in the odd number pulse signals and excitation light is emitted to the same region in the odd number pulse signals as shown in FIG. 9B. Temporal variation in green light intensity can be controlled as much as possible since excitation light is emitted to two parts as the regions where excitation light is emitted. However, more preferably, excitation light is emitted to the same region in every pulse signal.

Therefore, in the second embodiment, a method to emit excitation light to the same region on the fluorescent wheel 101 even when the j/k value is not an integer value will be described. In the second embodiment, the same reference numerals are used for the parts similar to those in the first embodiment and their descriptions are omitted.

Even in a case where the j/k value is 1.5 as described above, that is, even in a case where the fluorescent wheel 101 is rotating at the rotation frequency which is 1.5 times the display frequency, the control unit 41 adjusts the excitation light emission timing from the excitation light sources 71 so that excitation light is to be emitted on the same region in the fluorescent wheel 101.

Hereinafter, an emission timing adjustment method will be described in detail.

Figure 11:
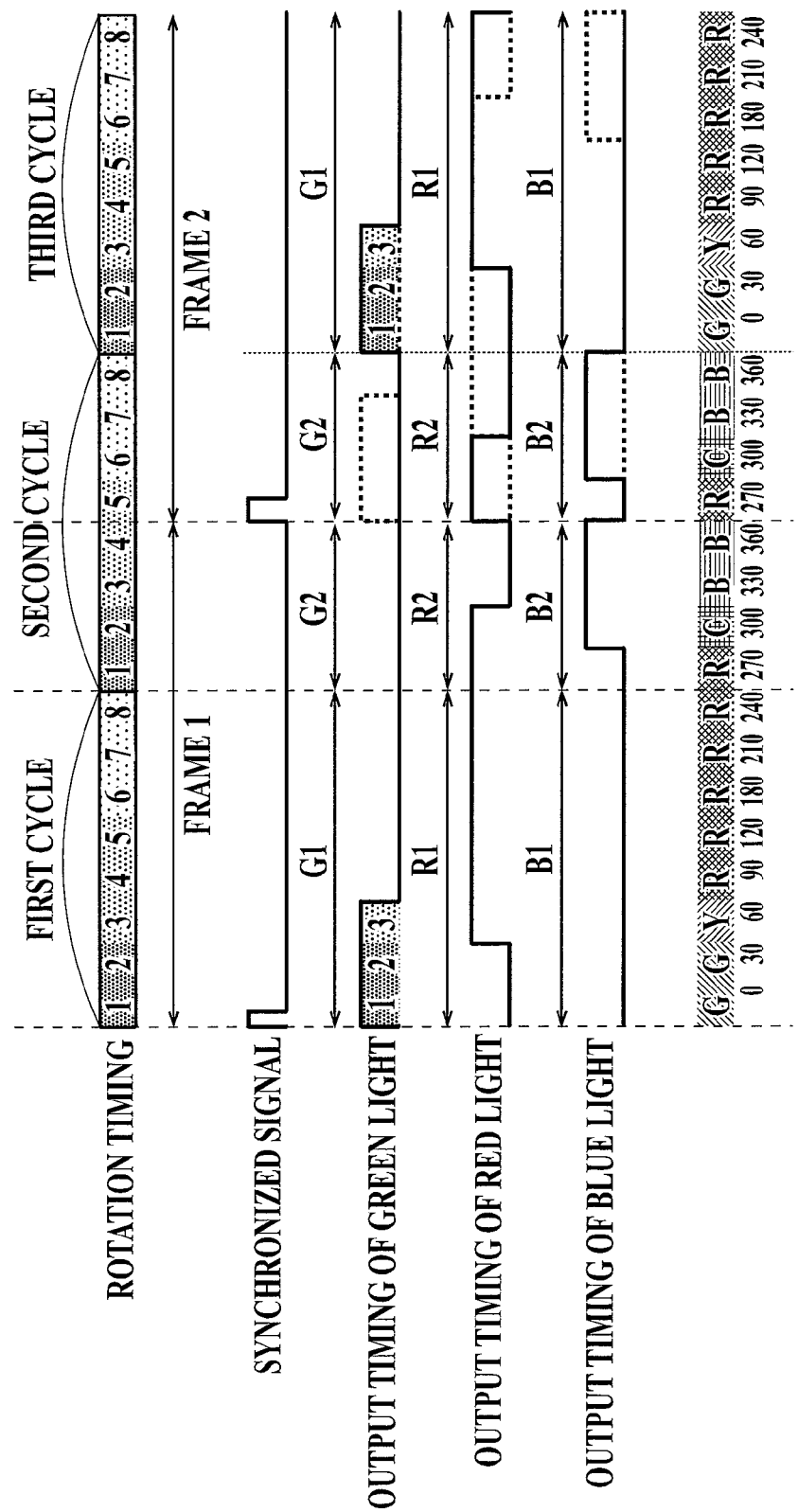
FIG. 11 is a timing chart showing rotation timing of the fluorescent wheel and output timing for emitting each color lights according to the second embodiment.

FIG. 11 is a timing chart showing rotation timing of the fluorescent wheel 101 and output timings for emitting each color light. In FIG. 11, the lower most row shows the colors which are projected due to emission of the individual color lights, and "G" indicates green, "Y" indicates yellow, "R" indicates red, "C" indicates cyan and "B" indicates blue.

On the basis of a synchronized signal to be input for each frame, the control unit 41 adjusts the output timing of individual color image signals according to image data. On the basis of the image signals output timings, emission timing of the individual color lights are similarly adjusted. The output timing of each color image signal and the emission timing of each color light are basically the same. Before adjustment, the output timing of each color image signal is formed by repeating the reference waveform in each frame. For example, in FIG. 11, the waveform in frame 1 is the reference waveform. In frame 2, the reference waveform is shown in the dotted line. What is obtained by this repetition of the reference waveform in each frame is referred to as an output timing chart. Before adjustment, the output timing (emission timing) of green light is the timing where the parts as regions where excitation light is emitted (fluorescence emission regions) are two similarly in FIG. 9B.

Therefore, the control unit 41 adjusts the green light emission timing so that the excitation light is emitted to the first region H1, the second region H2 and the third region H3 of the fluorescent wheel 101 also in frame 2 similarly to frame 1. The reference waveform in frame 1 includes the first waveform part G1 corresponding to the first cycle of the fluorescent wheel 101 and the second waveform part G2 corresponding to the second cycle of the fluorescent wheel 101. The control unit 41 performs adjustment by using the green light output timing chart of before adjustment so that the green light is also emitted to the fluorescence emission regions of the fluorescent wheel 101 which are the same as the regions in frame 1 in frame 2. In particular, the control unit 41 switches the waveform part G1 corresponding to the first cycle and the waveform part G2 corresponding to the second cycle. In such way, in frame 2, the waveform part G1 is applied to the third cycle of the fluorescent wheel 101 and the waveform part G2 is applied in the second cycle.

If only the green light emission timing is adjusted, matching with other color lights cannot be accomplished. Therefore, red light emission timing and blue light emission timing are also adjusted. At this time, with the adjustment result of the green light (reference color) emission timing being the reference, the control unit 41 adjusts the red light emission timing and the blue light emission timing.

In particular, the reference waveform of red light includes the first waveform part R1 corresponding to the first waveform part G1 and the second waveform part R2 corresponding to the second waveform part G2, and the control unit 41 performs adjustment so that these waveform parts match the adjustment result of the green light emission timing. Similarly, the reference waveform of blue light includes the first waveform part B1 corresponding to the first waveform part G1 and the second waveform part B2 corresponding to the second waveform part G2, and the control unit 41 performs adjustment so that these waveform parts match the adjustment result of the green light emission timing. In frame 3 and thereafter, the emission timing of each color in frame 1 and the emission timing of each color in frame 2 are repeated to perform adjustment for the overall light emission timing.

Further, the control unit 41 adjusts the image signal output timing corresponding to each color so as to synchronize to the after adjustment light emission timing. Here, since the output timing of each color image signal and the emission timing of each color light are the same as described above, output timing is adjusted in a similar manner as the light emission timing.

According to such controlling, although the number of fluorescence emission regions in the fluorescent wheel 101 is 2 parts before the adjustment, the number of fluorescence emission region is 1 part after the adjustment by the control unit 41. By adjusting the emission timing of the excitation light sources 71 as described above, excitation light is emitted to the same region in the fluorescent wheel 101, and temporal variation of green light intensity can be controlled the most.

Further, image signal output timing for carrying out display in the display element is adjusted so as to synchronize with the emission timing of the excitation light sources 71. When the emission timing of the excitation light sources 71 and the image signal output timing are synchronized as described above, the control unit 41 can appropriately output an image signal with respect to the emission timing even after the adjustment.

Furthermore, the image signal output timing of reference color (green) corresponding to the excitation light sources 71 is adjusted and the image signal output timing of colors other than the reference color is adjusted on a basis of the adjustment result, at the time of adjusting the image signal output timing. Therefore, the control unit 41 can easily match the output timing of colors other than the reference color to the output timing of the reference color.

The image signal output timing is adjusted by using the output timing chart of each color before adjustment by phase shifting. Therefore, there is no need to recreate output timing of each color at the time of adjustment from the beginning and the effort can be saved in the adjustment.

If the j/k value is 1.5, the relation between the display frequency and the rotation frequency is 2:3. Thereby, as shown in FIG. 11, the control unit 41 can adjust the emission timing with a simple adjustment by switching the emission timing in each frame.

Figure 12:
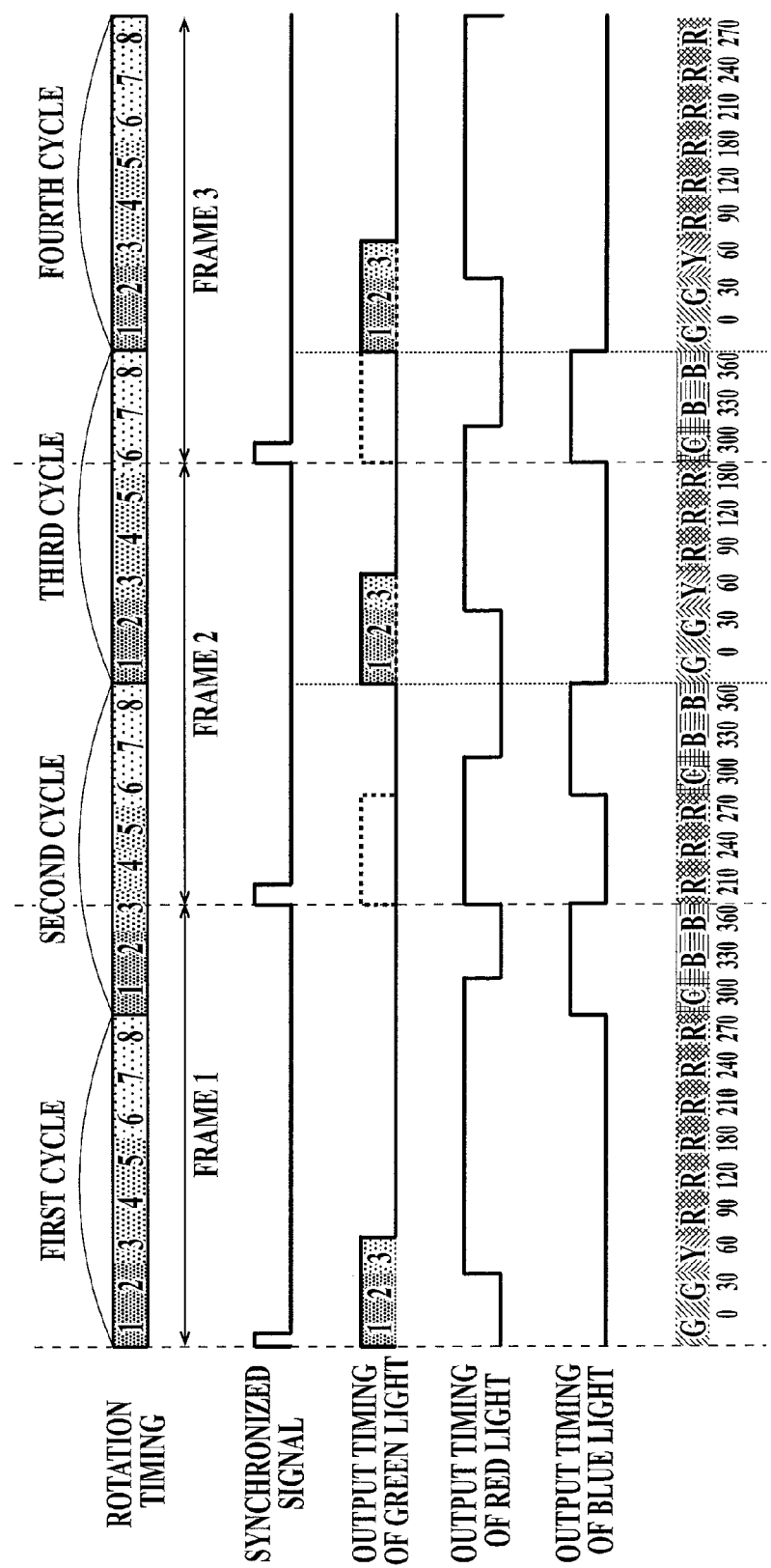
FIG. 12 is a timing chart showing rotation timing of the fluorescent wheel and output timings for emitting each color light, which is a modification example of FIG. 11.

Here, even if the j/k value is not an integer other than 1.5, it is preferred that the emission timing of the excitation light sources 71 is adjusted. For example, FIG. 12 is a timing chart showing the rotation timing of the fluorescent wheel 101 and the output timing for emitting each color light in a case where the j/k value is 1.333 . . . (the relation between display frequency and the rotation frequency is 3:4).

On the basis of a synchronized signal input for each frame, the control unit 41 adjusts the image signal output timing of each color according to image data. On the basis of the image signal output timing, emission timing of each color light is similarly adjusted. Before adjustment, the image signal output timing of each color is formed by repeating the reference waveform for each frame. For example, in FIG. 12, the waveform in frame 1 is the reference waveform. In frames 2 and 3, the reference waveform is shown in dotted lines. What is formed by this repetition of the reference waveform in each frame is referred to as the output timing chart. Before adjustment, the green light output timing (emission timing) is timing including three fluorescence emission regions.

Therefore, the control unit 41 adjusts the emission timing of green light so that excitation light emits the first region H1, the second region H2 and the third region H3 of the fluorescent wheel 101 in frames 2 and 3 similarly to frame 1. In particular, the control unit 41 performs the adjustment by using the green output timing of before adjustment so that green light is emitted to the fluorescence emission regions in the fluorescent wheel 101 which are the same as those in frame 1 also in frames 2 and 3. In particular, the control unit 41 matches the tip of the reference waveform at the tip of the first region H1 in frames 2 and 3, respectively, to fit the reference waveform therefrom (the phase of the reference waveform is delayed until the timing of the tip of the first region H1 so that the reference waveform starts from the tip of the first region H1).

Then, the control unit 41 fits the part that exceeds the end of frames 2 and 3 in the space between the tip of frames 2 and 3 and the tip of the first region H1, respectively. In such way, the emission timing of the excitation light sources 71 is adjusted so that green light emits the same fluorescence emission regions.

Then, the control unit 41 adjusts emission timing of red light and blue light. At this time, with the adjustment result of the emission timing of green light (reference color) being the reference, the control unit 41 adjusts emission timing of red light and blue light.

The emission timing of each color of frames 1 to 3 is repeated in frame 4 and thereafter to adjust the overall emission timing. Further, the control unit 41 adjusts image signal output timing corresponding to each color so as to synchronize with the emission timing of after adjustment. Here, as described above, since the image signal output timing of each color and the emission timing of each color light are the same, the output timing is also adjusted similarly as the emission timing.

In the second embodiment, a case where the number of fluorescence emission regions is 1 after the adjustment of the emission timing is described as an example. However, if at least the number of fluorescence emission regions is reduced comparing to before adjustment, temporal variation in green light intensity can be controlled more comparing to before adjustment. For example, in the case of FIG. 12, the number of parts of fluorescence emission region is "3" before adjustment and this is adjusted to "1". However, this may be adjusted to "2".

Further, in order to prevent excitation light from intensively emitting to one part of the fluorescent wheel, it is preferred that irradiation region in the fluorescent wheel with excitation light is dispersed to the entire fluorescent wheel.

Hereinafter, a configuration for dispersing the irradiation region will be described.

Figure 13:
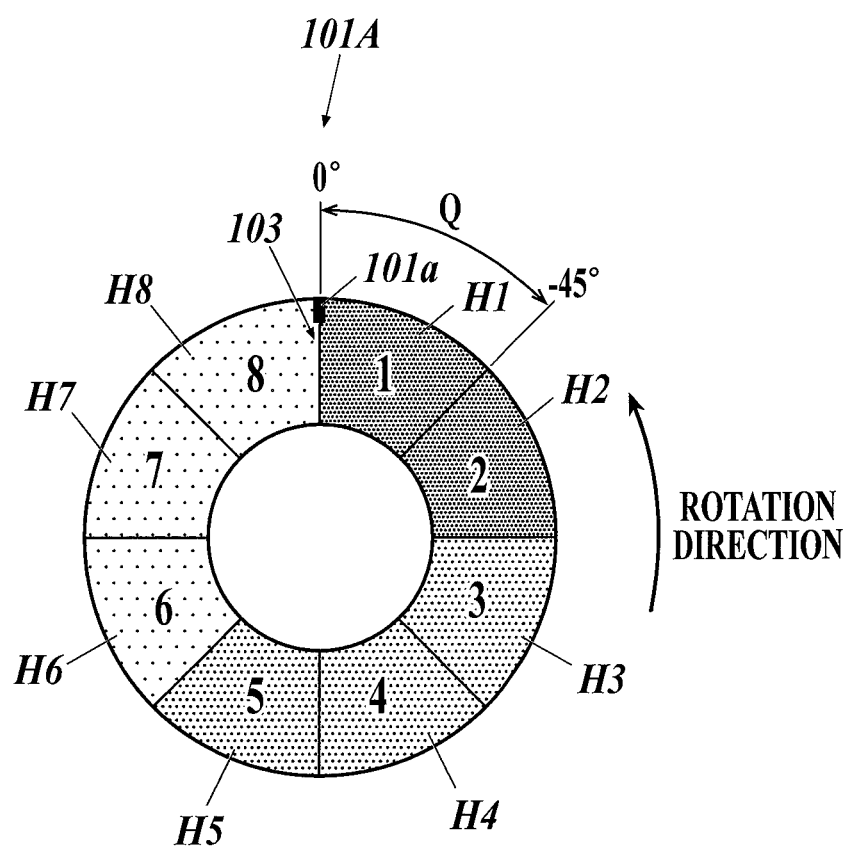
FIG. 13 is a front schematic view of a fluorescent wheel in a light source unit which is a modification example.

FIG. 13 is a front view showing a schematic structure of the fluorescent wheel 101A in the light source unit for dispersing the irradiation region. As shown in FIG. 13, the fluorescent wheel 101A is provided with the rotation reference unit 101a made of a magnetic body, for example. By detecting the rotation reference unit 101a by the aftermentioned reference detection unit 80, not only rotation speed but also rotation phase can be detected. Further, in the fluorescent wheel 101A, as the irradiation region (a predetermined region) of excitation light from the excitation light sources 71, the fluorescent wheel 101A is divided in eight regions (the first region H1, the second region H2, the third region H3, the fourth region H4, the fifth region H5, the sixth region H6, the seventh region H7, the eight region H8).

Figure 14:
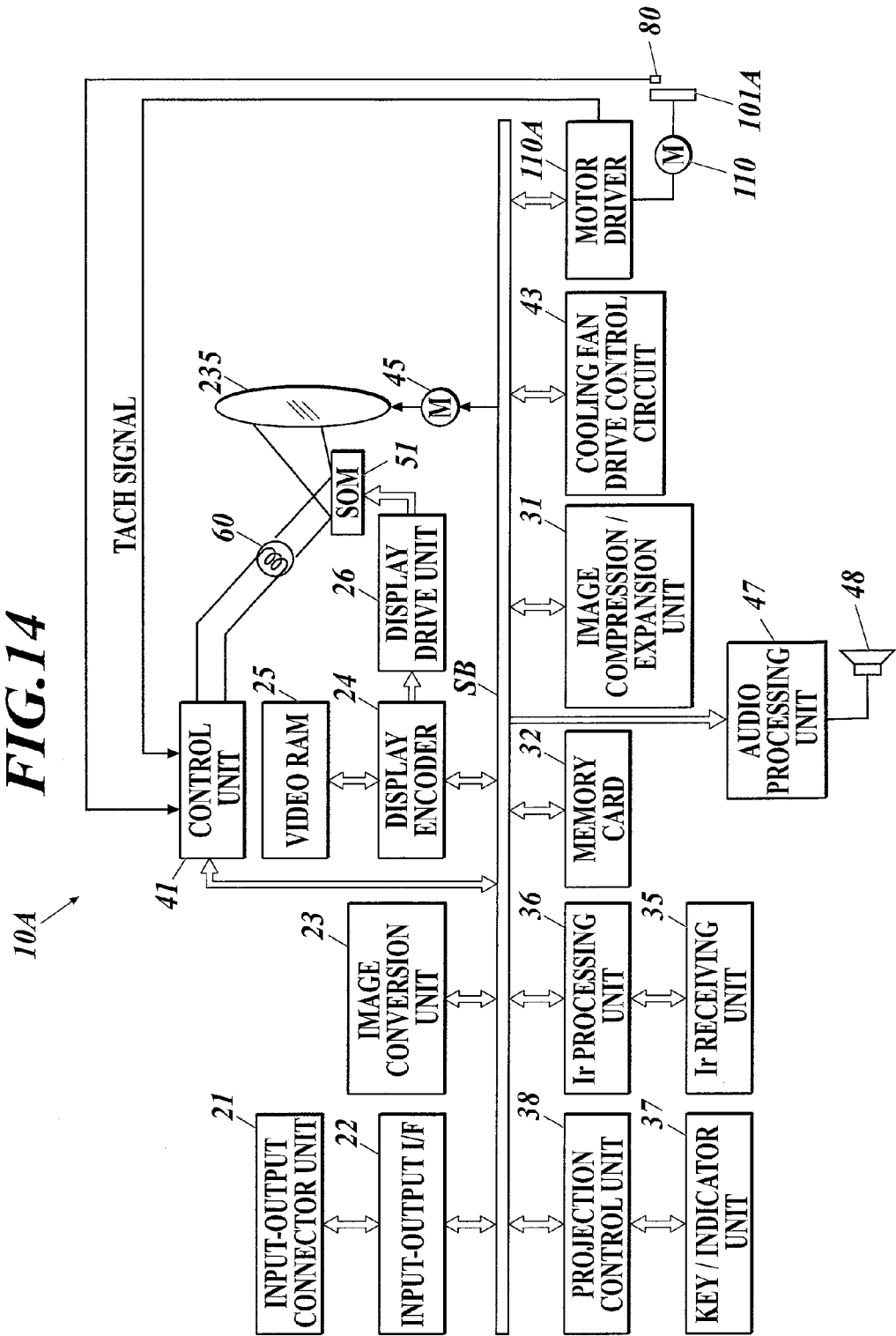
FIG. 14 shows a functional circuit block of a projection apparatus provided with a light source unit which is a modification example.

FIG. 14 shows a functional circuit block of the projection apparatus 10A for dispersing the irradiation region. The projection apparatus 10A is provided with a reference detection unit 80 which detects the rotation reference unit 101A of the fluorescent wheel 101A. As for the reference detection unit 80, for example, Hall effect device for detection of a magnetic field by using the Hall effect, an optical element such as a reflecting type photoreflector, etc. are used. The reference detection unit 80 is electrically connected to the control unit 41, and the detection result is to be output to the control unit 41.

On the basis of the detection result from the reference detection unit 80 and the emission timing of the excitation light sources 71, the control unit 41 recognizes the irradiation regions in the fluorescent wheel 101A where excitation light is emitted (the first region H1, the second region H2, the third region H3, the fourth region H4, the fifth region H5, the sixth region H6, the seventh region H7, the eight region H8) and excitation light irradiation time in the irradiation regions. Then, the control unit 41 also functions as an irradiation time integrator unit which integrates irradiation time during which a predetermined region in the fluorescent plate is irradiated by the excitation light from the excitation light source with respect to each predetermined region, by dividing the fluorescent plate in a plurality of predetermined regions. The control unit 41 stores the integrated irradiation time of each irradiation region.

The control unit 41 controls the wheel motor 110 so as to change the lighting start time which is the time till the excitation light sources 71 are lit from the reference detection unit 80 detects the rotation reference unit 80 of the fluorescent wheel 101A in each predetermined timing. In particular, the control unit 41 recognizes the timing where the irradiation time of one irradiation region exceeded a predetermined time as a predetermined timing, and changed the lighting start time.

For example, it is assumed that the excitation light irradiation range Q emitted from the excitation light sources 71 is within the range of −45 degrees to 0 degrees in FIG. 13. Further, the reference detection unit 80 is to detects the rotation reference unit 101a being at the position of 0 degrees. Then, in a case where a specific irradiation region is made to be within the irradiation range Q and excitation light is emitted, when the fluorescent wheel 101A rotates and the control unit 41 recognizes the rotation reference unit 101a from the detection result of the reference detection unit 80, the control unit 41 decides the lighting start time of the excitation light sources 71 on the basis of the rotation frequency of the fluorescent wheel 101A and the angle (phase) to the irradiation region from the rotation reference unit 101a.

In particular, when the control unit 41 determines that the display frequency and the rotation frequency are synchronized, if the first region H1 is to be within the irradiation region Q, for example, the control unit 41 adjusts the lighting start time (timing) so as to wait for that timing. In such case, it is needless to say that the image signal output timing is also adjusted in conformity with the lighting start time.

By changing the lighting start time as described above, a specific irradiation region can be within the irradiation range Q and the irradiation region at the time of lighting start can be changed. In such way, the irradiation region in the fluorescent wheel 101A can be dispersed with a predetermined timing, and the fluorescent wheel 101A can be prevented from being degraded intensively at a part. Therefore, a clear and stable image can be projected for the long term.

In the second embodiment, a case where the irradiation range of the fluorescent wheel 101 is divided in eight is described as an example. However, the irradiation range may be divided in two to seven, or may be divided in nine or more.

Further, the above described light source unit 60 may be applied to a rear projection display apparatus.

Although several embodiments of the present invention are described, the scope of the present invention is not limited to the above embodiments and includes the scope of the invention described in claims and the equivalent thereof.

What is claimed is:

1. A light source unit which emits fluorescence light to a display element which displays an image by using the fluorescence light, comprising:
   an excitation light source which emits excitation light;
   a fluorescent plate including a fluorescence emission region on a surface of a circular substrate which emits the fluorescence light by the fluorescence emission region being irradiated with the excitation light from the excitation light source;
   a drive unit which rotates the fluorescent plate in a circumferential direction; and
   a control unit which controls the excitation light source and the drive unit,
   wherein the control unit controls the drive unit so that a display frequency of the display element and a rotation frequency of the fluorescent plate fulfill formula (1)

$$j \times \text{display frequency} = k \times \text{rotation frequency} \qquad (1),$$
   wherein j and k are integers, and j>k, and wherein the control unit decides two or more combinations of the j and the k so that a j/k value is different and switches between the combinations of the j and the k according to a predetermined condition.

2. The light source unit according to claim 1, wherein the control unit decides the j and the k so as to make a range of the rotation frequency be narrower than a range of the display frequency of the display element in terms of a ratio of an upper limit to a lower limit.

3. The light source unit according to claim 1, wherein:
the predetermined condition is whether a current display frequency is a predetermined value or greater, and
when the current display frequency is smaller than the predetermined value, the control unit selects a combination of the j and the k of a greater j/k value, and when the current display frequency is the predetermined value or greater, the control unit selects a combination of the j and the k of a smaller j/k value.

4. The light source unit according to claim 3, wherein:
the predetermined value has a predetermined range, and
when the current display frequency is smaller than a lower limit value of the predetermined range, the control unit selects the combination of the j and the k of the greater j/k value, when the current display frequency is an upper limit value of the predetermined range or greater, the control unit selects the combination of the j and k of the smaller j/k value, and when the current display frequency is within the predetermined range, the control unit carries on a last target rotation frequency.

5. The light source unit according to claim 1, wherein:
the control unit compares a current display frequency to a first threshold and a second threshold which is greater than the first threshold,
as the predetermined condition, when the current display frequency varies so as to be smaller than the first threshold, the control unit selects a combination of the j and the k of a greater j/k value, and
as the predetermined condition, when the current display frequency varies so as to be greater than the second threshold, the control unit selects a combination of the j and the k of a smaller j/k value.

6. The light source unit according to claim 1, further comprising an informing unit;
wherein when the j and the k cannot be decided so that the rotation frequency is within a frequency range for stable rotation of the drive unit, the control unit controls the informing unit and informs that the rotation frequency is not within the frequency range for stable rotation.

7. The light source unit according to claim 1, wherein the control unit decides the j and the k so that a j/k value is an integer.

8. The light source unit according to claim 1, wherein the control unit lights the excitation light source in a time-shared manner.

9. The light source unit according to claim 1, wherein the control unit decides the j and the k so that the display frequency is within a displayable frequency range of the display element.

10. The light source unit according to claim 1, further comprising an informing unit,
wherein when the control unit cannot decide the j and the k so that the display frequency is within a displayable frequency range, the control unit controls the informing unit and informs that the display frequency is not within the displayable frequency range.

11. A projection apparatus, comprising:
the light source unit according to claim 1;
the display element;
a light guiding optical system which guides light from the light source unit to the display element;
a projection side optical system which projects an image output from the display element on a screen; and
a projection control unit which controls the light source unit and the display element.

12. The light source unit according to claim 1, wherein the control unit decides the j and the k so that the rotation frequency is within a frequency range for stable rotation of the drive unit.

13. A light source unit which emits fluorescence light to a display element which displays an image by using the fluorescence light, comprising:
an excitation light source which emits excitation light;
a fluorescent plate including a fluorescence emission region on a surface of a circular substrate which emits the fluorescence light by the fluorescence emission region being irradiated with the excitation light from the excitation light source;
a drive unit which rotates the fluorescent plate in a circumferential direction; and
a control unit which controls the excitation light source and the drive unit,
wherein the control unit controls the drive unit so that a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein when the control unit decides the j and the k so that a j/k value is not an integer, the control unit adjusts an excitation light emission timing from the excitation light source so that a number of fluorescence emission regions in the fluorescent plate where the excitation light is emitted is reduced.

14. The light source unit according to claim 13, wherein:
the control unit adjusts an image signal output timing with respect to a reference color corresponding to the excitation light source and, with an adjustment result thereof being a reference, adjusts the image signal output timing with respect to a color other than the reference color so as to synchronize with the emission timing; and
the image signal output timing is adjusted by shifting a phase of an output timing chart of each color of before adjustment.

15. The light source unit according to claim 13, wherein the control unit decides the j and the k so that a j/k value is 1.5.

16. The light source unit according to claim 15, wherein the control unit adjusts an excitation light emission timing by switching an emission timing of the excitation light from the excitation light source in each frame.

17. A light source unit which emits fluorescence light to a display element which displays an image by using the fluorescence light, comprising:
an excitation light source which emits excitation light;
a fluorescent plate including a fluorescence emission region on a surface of a circular substrate which emits the fluorescence light by the fluorescence emission region being irradiated with the excitation light from the excitation light source;
a drive unit which rotates the fluorescent plate in a circumferential direction; and
a control unit which controls the excitation light source and the drive unit, wherein the control unit controls the drive unit so that a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein the light source unit further comprises an irradiation time integrator unit which integrates an irradiation time during which a predetermined region in the fluorescent plate is irradiated by the excitation light from the excitation light source with respect to each predetermined region, by dividing the fluorescent plate in a plurality of predetermined regions, and wherein the control unit varies a lighting start time based on the integrated irradiation time of each of the predetermined regions calculated by the irradiation time integrator unit.

18. A projection method to emit fluorescence light to a display element which displays an image by using the fluorescence light, the method comprising:

rotating, by a drive unit, a fluorescent plate including a fluorescence emission region on a surface of a circular substrate; and generating the fluorescence light by emitting excitation light to the fluorescence emission region, wherein at a time of the rotating and the generating, a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein two or more combinations of the j and the k are decided so that a j/k value is different and the combinations of the j and the k are switched between according to a predetermined condition.

19. A non-transitory recording medium which stores a program to be executed by a computer of a light source unit comprising an excitation light source which emits excitation light; a fluorescent plate including a fluorescence emission region on a surface of a circular substrate which emits the fluorescence light to a display element which displays an image by the fluorescence emission region being irradiated with the excitation light from the excitation light source; and a drive unit which rotates the fluorescent plate in a circumferential direction;

wherein the program is executable by the computer to control the drive unit to function so that a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein two or more combinations of the j and the k are decided so that a j/k value is different and the combinations of the j and the k are switched between according to a predetermined condition.

20. A projection method to emit fluorescence light to a display element which displays an image by using the fluorescence light, the method comprising:

rotating, by a drive unit, a fluorescent plate including a fluorescence emission region on a surface of a circular substrate; and generating the fluorescence light by emitting excitation light to the fluorescence emission region, wherein at a time of the rotating and the generating, a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein when the j and the k are decided so that a j/k value is not an integer, an excitation light emission timing for the excitation light is adjusted so that a number of fluorescence emission regions in the fluorescent plate where the excitation light is emitted is reduced.

21. A projection method to emit fluorescence light to a display element which displays an image by using the fluorescence light, the method comprising:

rotating, by a drive unit, a fluorescent plate including a fluorescence emission region on a surface of a circular substrate; and generating the fluorescence light by emitting excitation light to the fluorescence emission region, wherein at a time of the rotating and the generating, a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein the method further comprises integrating an irradiation time during which a predetermined region in the fluorescent plate is irradiated by the excitation light with respect to each predetermined region, by dividing the fluorescent plate in a plurality of predetermined regions, and wherein a lighting start time is varied based on the integrated irradiation time of each of the predetermined regions.

22. A non-transitory recording medium which stores a program to be executed by a computer of a light source unit comprising an excitation light source which emits excitation light; a fluorescent plate including a fluorescence emission region on a surface of a circular substrate which emits the fluorescence light to a display element which displays an image by the fluorescence emission region being irradiated with the excitation light from the excitation light source; and a drive unit which rotates the fluorescent plate in a circumferential direction;

wherein the program is executable by the computer to control the drive unit to function so that a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein when the j and the k are decided so that a j/k value is not an integer, an excitation light emission timing from the excitation light source is adjusted so that a number of fluorescence emission regions in the fluorescent plate where the excitation light is emitted is reduced.

23. A non-transitory recording medium which stores a program to be executed by a computer of a light source unit comprising an excitation light source which emits excitation light; a fluorescent plate including a fluorescence emission region on a surface of a circular substrate which emits the fluorescence light to a display element which displays an image by the fluorescence emission region being irradiated with the excitation light from the excitation light source; and a drive unit which rotates the fluorescent plate in a circumferential direction;

wherein the program is executable by the computer to control the drive unit to function so that a display frequency of the display element and a rotation frequency of the fluorescent plate fulfill formula (1)

$$j \times \text{display frequency} = k \times \text{rotation frequency} \quad (1),$$
wherein j and k are integers, and j>k, and wherein the program is further executable by the computer to integrate an irradiation time during which a predetermined region in the fluorescent plate is irradiated by the excitation light from the excitation light source with respect to each predetermined region, by dividing the fluorescent plate in a plurality of predetermined regions, and
wherein a lighting start time is varied based on the integrated irradiation time of each of the predetermined regions.

* * * * *